(12) United States Patent
Suwa et al.

(10) Patent No.: US 7,699,423 B2
(45) Date of Patent: Apr. 20, 2010

(54) IMAGE PROCESSING APPARATUS, IMAGE PROCESSING METHOD, AND IMAGE PROCESSING PROGRAM

(75) Inventors: Tetsuya Suwa, Yokohama (JP); Fumitaka Goto, Tokyo (JP); Yusuke Hashii, Kawasaki (JP); Fumihiro Goto, Kawasaki (JP); Masao Kato, Kawasaki (JP); Kentaro Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 11/963,777

(22) Filed: Dec. 21, 2007

(65) Prior Publication Data
US 2008/0106569 A1 May 8, 2008

Related U.S. Application Data

(63) Continuation of application No. PCT/JP2007/063870, filed on Jul. 5, 2007.

(30) Foreign Application Priority Data

Jul. 7, 2006 (JP) .............................. 2006-188048

(51) Int. Cl.
*B41J 2/205* (2006.01)
(52) U.S. Cl. .......................................... 347/15; 347/14
(58) Field of Classification Search .................. 347/14, 347/15, 43, 41; 358/3.01, 3.21
See application file for complete search history.

(56) References Cited

U.S. PATENT DOCUMENTS 5,038,208 A    8/1991 Ichikawa et al.
5,087,972 A    2/1992 Sumi
5,283,657 A    2/1994 Ichikawa et al.
5,508,823 A    4/1996 Kiyohara et al.
5,784,499 A    7/1998 Kuwahara et al.
2006/0228005 A1   10/2006 Matsugu et al.

FOREIGN PATENT DOCUMENTS

| DE | 38 55 971 | 12/1997 |
|---|---|---|
| DE | 38 56 537 | 4/2003 |
| EP | 0 317 268 | 5/1989 |
| EP | 0 725 531 | 8/1996 |
| JP | 2-692875 | 2/1990 |
| JP | 2-275589 | 11/1990 |
| JP | 7-288768 | 10/1995 |
| JP | 10-95135 | 4/1998 |
| JP | 10-200733 | 7/1998 |
| JP | 2003-264701 | 9/2003 |
| JP | 2004-056252 | 2/2004 |

*Primary Examiner*—Thinh H Nguyen
(74) *Attorney, Agent, or Firm*—Fitzpatrick, Cella, Harper & Scinto

(57) ABSTRACT

In an ink-jet printer, when a gray is expressed by mixing ink of a plurality of colors, there is a concentration in which a use amount of the ink is large. If the gray in an edge portion of a character has the concentration of the large ink use amount, a bleeding of the ink occurs and a thin portion of the character is sometimes damaged. If the gray in the character edge portion has the concentration of the large ink use amount, the gray in the character edge portion is changed to the white side by image correction, and the damage of the character thin portion caused due to the ink bleeding is prevented.

23 Claims, 16 Drawing Sheets

FIG. 6
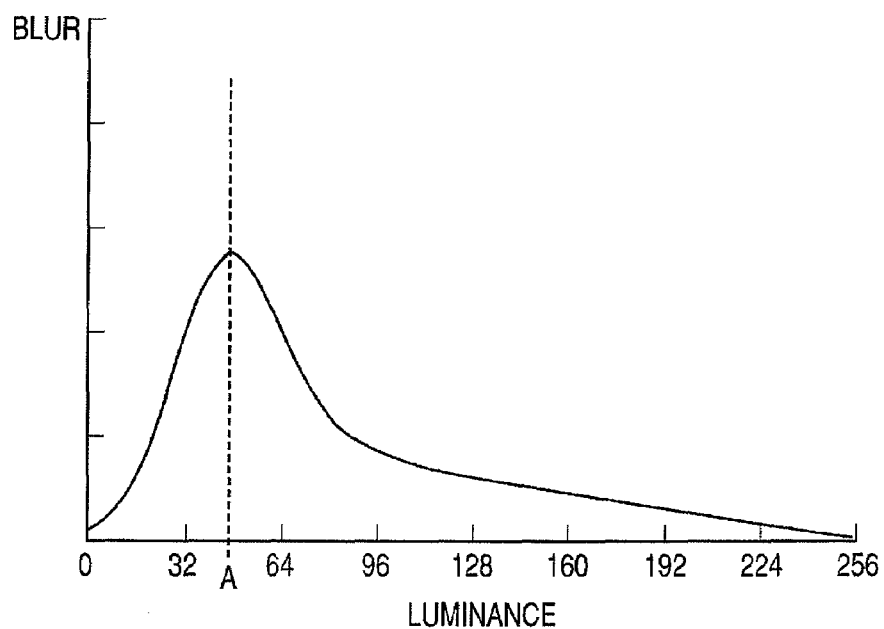
FIG. 7A
FIG. 7B

FIG. 8A1
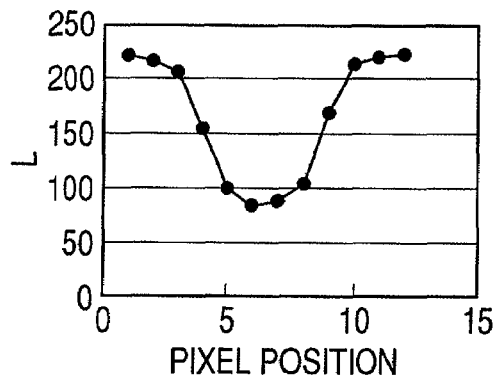
FIG. 8A2
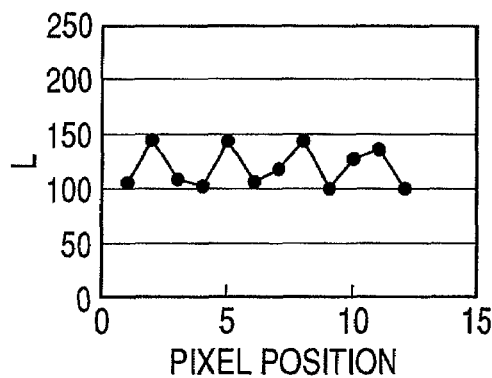
FIG. 8B1
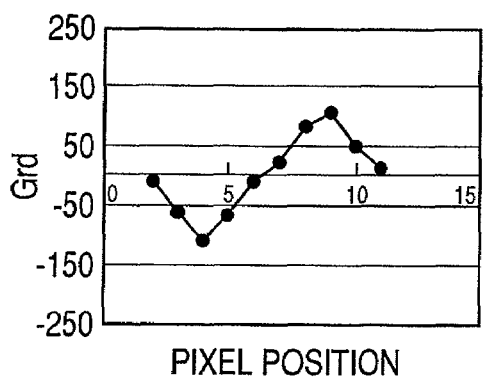
FIG. 8B2
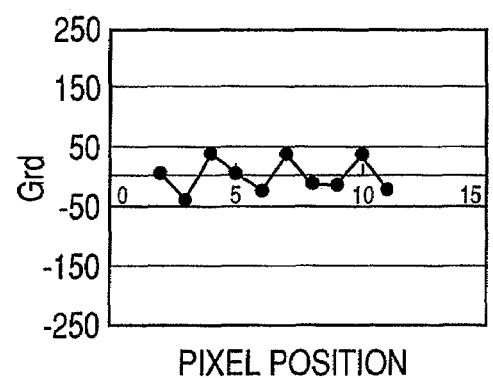
FIG. 8C1
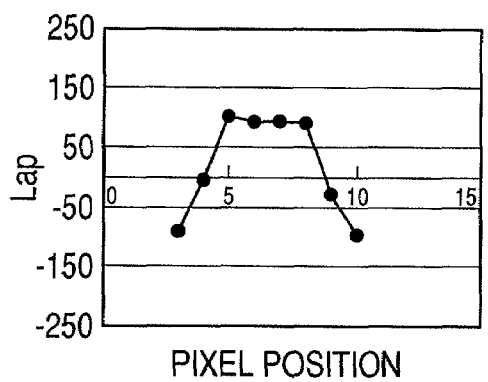
FIG. 8C2
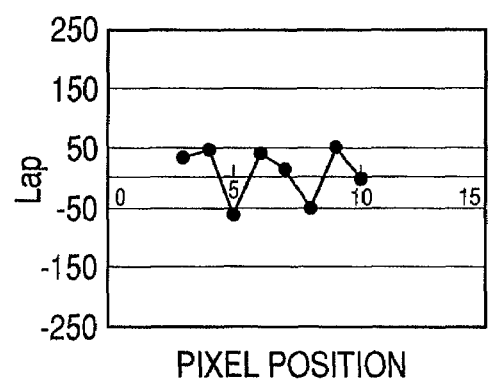

FIG. 9
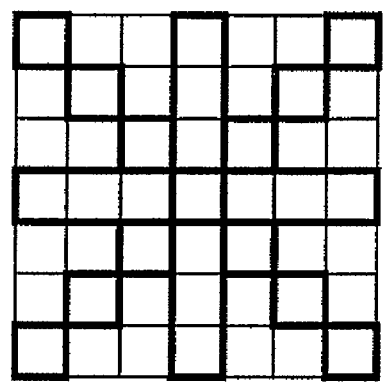
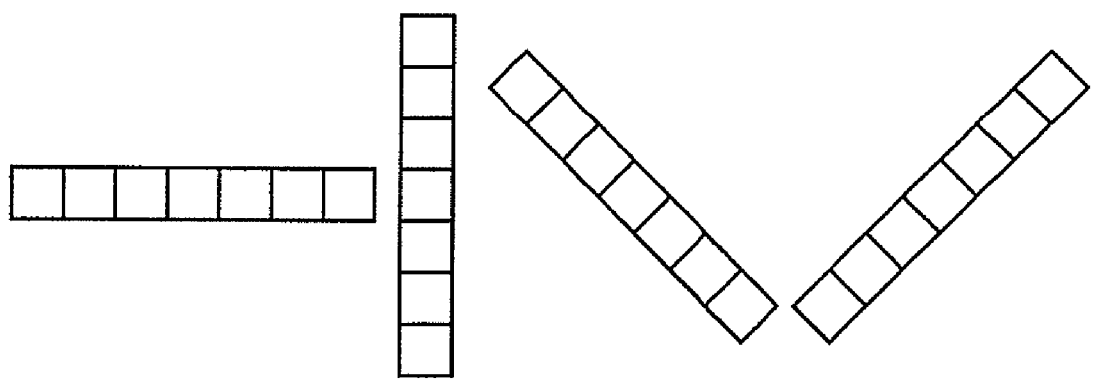

CONCENTRATION 128        192        255

IMAGE PROCESSING APPARATUS, IMAGE PROCESSING METHOD, AND IMAGE PROCESSING PROGRAM

This application is a continuation of International Application No. PCT/JP2007/063870, filed Jul. 5, 2007, which claims the benefit of Japanese Patent Application No. 2006-188048, filed Jul. 7, 2006.

BACKGROUND OF THE INVENTION

1. Field of the Invention

The present invention relates to an image processing apparatus for executing an image correction to digital image data for recording.

2. Description of the Related Art

An image copying apparatus includes an input apparatus unit and an output apparatus unit. An image of an input original document is optically read out by a scanner as an input apparatus unit, a predetermined image process is executed to the read image, and thereafter, printing is executed according to a predetermined recording method by the output apparatus unit.

A concentration change of an edge (outline) portion of the image (multi-value data) obtained by optically reading the original by the scanner is more gentle than that of an edge portion of the original image. If such an image (multi-value data) is printed as it is onto a recording medium, an image whose sharpness has been deteriorated is obtained.

To solve such a problem, hitherto, there is such a technique that when a distribution shape of an image signal at a target point is upwardly convex, the image signal is converted into an image emphasis signal larger than the image signal at the target point, and when the distribution shape of the image signal is downwardly convex, the image signal is converted into the image emphasis signal smaller than the image signal at the target point. There is also such a technique that if the distribution shape of the image signal is neither upwardly convex nor downwardly convex, the image signal is converted into one of the original image signal and a signal replaced by an unsharp signal (for example, refer to the Official Gazette of Japanese Patent No. 2620368).

There is also such a technique that a value of the target pixel is replaced by a replacement pixel value formed by using the target pixel of the image and a pixel adjacent to the target pixel (for example, refer to Japanese Patent Application Laid-Open No. 07-288768).

Further, as for such an inconvenience that not only the sharpness is deteriorated but also a dot drop-out and an elimination of a thin line at the time of reduction occur, there is a method of avoiding the inconvenience by changing a resolution of one of the data input apparatus and the data output apparatus (for example, refer to Japanese Patent Application Laid-Open No. 2004-056252).

There is also such a technique that a zoom ratio and a width of outline of an image can be freely adjusted (for example, refer to Japanese Patent Application Laid-Open No. 10-200733). When the user magnifies or reduces the image, since the width of outline is changed, such a technique is effective to suppress that an inconvenience occurs in the image of the edge portion due to a zooming (variable magnification process).

SUMMARY OF THE INVENTION

However, output image quality is not always improved by executing the edge emphasis by the above method.

An example of a bold character is illustrated in FIG. 12. The left side of the diagram illustrates an original image and there is a blur in each edge portion. Such an original image is read out, an image obtained by executing an edge emphasis to the pixels in the blur portion is output by a recording apparatus, and the output image is illustrated on the right side of the diagram. It will be understood from the diagram of the right side that a thin portion of the character which has been recorded and output is damaged and discriminating performance is deteriorated. Such a problem typically occurs in the case where a bold character as a character type is read out or an original document having complicated Chinese characters (Kanji) is read out.

In an ink-jet printer of an ink-jet recording system which has been being spread in recent years, since a bleeding of ink further occurs, such a problem is serious. Since the ink bleeding depends on characteristics of the ink or characteristics of the recording medium, even if the same printer is used, the ink bleeding changes depending on a difference between the ink types or a difference between the recording media and, further, a combination of them. Therefore, there is also a method of preliminarily correcting the ink bleeding in consideration of a bleeding ratio in their combination. However, there is a case where the correction is insufficient even if such a method is used.

In the ink-jet recording system, a multi-color image has been realized in association with the realization of high picture quality. Thus, the number of apparatuses in which only the single ink such as black ink is mounted is small at present. Even in the case of copying one document, generally, several kinds of ink are used. This is also true of the case of monochromatic copying or copying of a monochromatic original document. Although monochromatic printed matter is eventually obtained, a case where such monochromatic printed matter is recorded by what is called a process color, combined with color inks is not rare.

FIG. 13 illustrates an example of a use of ink of a gray line using four types of ink of four colors of cyan (C), magenta (M), yellow (Y), and black (K). It will be understood that in order to reduce granularity or adjust a hue of a gray color, a highlight portion is constructed by three colors of cyan, magenta, and yellow and black ink is gradually used. A total amount of ink is also shown. The total ink amount indicates a liquid amount of the ink which is deposited onto the paper surface. As a concentration increases from the highlight portion, the total ink amount increases. As the ink is gradually replaced with the black ink, the total ink amount decreases.

FIG. 14 is a diagram illustrating a gradation of a thin line gray recorded by such an ink using method. It will be understood that the bleeding of the thin line is prominent at a middle position (near the concentration of 192) in an interlocking relational manner with the increase in total ink amount. That is, even if a bleeding ratio is corrected only by the combination of the ink and the recording medium, since the total ink amount is not considered, the desirable edge emphasis cannot be always realized. Particularly, in the case where the original image is read out by the scanner, since the original image has been printed by a dot system or illumination light is transmitted because an illumination light amount is extremely larger as compared with a thickness of original, there is a case where a decrease in concentration of the image occurs. In such a case, there occurs such a problem that if a character portion has exactly a concentration at which the total ink amount is large and the bleeding ratio is high, the discriminating performance of the recorded characters is deteriorated. Moreover, in the case of a reduction copy, the discriminating performance of the output printed matter is further deteriorated and a serious result is obtained.

In an ink-jet recording device, a method whereby the number of nozzles adapted to discharge the black ink is set to be larger than the number of nozzles adapted to discharge the color ink and the monochromatic printing is performed by using the black nozzles, thereby realizing a high printing speed, has also been realized. In such a case, even in the color printing, there is also a method whereby whether an area is a monochromatic area or a color area is discriminated with respect to a certain area (called a band) in the main scanning direction of the read-out image as illustrated in FIG. 15. If it is decided that the area is a monochromatic band, the recording is executed only with the black ink. In the other case, the recording is executed with the ordinary color ink or with a combination of the color ink and the black ink. In such a process, not only the bleeding ratio correction by the concentration but also the bleeding ratio of the using ink according to a discrimination result of each band have to be considered.

According to the foregoing related arts, nothing is considered with respect to a countermeasure against the problems due to the characteristics of the recording apparatus as mentioned above. Also in other literatures, there is no disclosure about prevention of the edge deterioration that is caused by such an ink using method.

It is an object of the invention to perform an edge emphasis in consideration of a bleeding of ink.

To solve the above problems, the invention is directed to an image processing apparatus for an image constructed by a signal of at least one color and a plurality of pixels, comprising: a correction concentration obtaining unit which obtains a concentration after a correcting process; a correction coefficient changing unit which changes a correction coefficient based on a value of the concentration obtained by the correction concentration obtaining unit; an image correcting unit which makes a correction by the correction coefficient changed by the correction coefficient changing unit; and an image recording processing unit which executes a recording process to the image corrected by the image correcting unit.

Further, the invention is directed to an image processing apparatus for an image constructed by a signal of at least one color and a plurality of pixels, comprising: an ink color discrimination processing unit which decides a color of ink which is used from a value of the signal; a correction concentration obtaining unit which obtains a concentration after a correcting process; a correction coefficient changing unit which changes a correction coefficient from information of the using ink decided by the ink color discrimination processing unit and a value of the concentration obtained by the correction concentration obtaining unit; an image correcting unit which makes a correction by the correction concentration changed by the correction coefficient changing unit; and an image recording processing unit which executes a recording process to the image corrected by the image correcting unit.

Further features of the present invention will become apparent from the following description of exemplary embodiments with reference to the attached drawings.

BRIEF DESCRIPTION OF THE DRAWINGS

FIGS. 1A and 1B are diagrams for describing an MFP apparatus, in which FIG. 1A illustrates a state where a feeder/copyboard cover is closed and FIG. 1B illustrates a state where the feeder/copyboard cover is opened.

FIG. 6 is a BLUR table in ink of four colors.

FIGS. 7A and 7B are diagrams for obtaining the BLUR table.

FIGS. 8A1, 8A2, 8B1, 8B2, 8C1, and 8C2 are explanatory diagrams of a luminance, a linear differentiation, a ternarizing process, and a quadratic differentiation.

FIG. 9 is an explanatory diagram of a 4-directional extraction.

DESCRIPTION OF THE EMBODIMENTS

An exemplary embodiment for embodying the invention will be described hereinbelow.

The embodiment of the invention will be described hereinbelow with respect to a copying function of a multi function printer (MFP) apparatus as an example. However, the invention is not limited to such an example but can be also embodied in the case where data transmitted from a computer apparatus (hereinafter, abbreviated to "PC" as a personal computer) is printed by the MFP apparatus or a printer.

<MFP Apparatus>

Figure 1A:
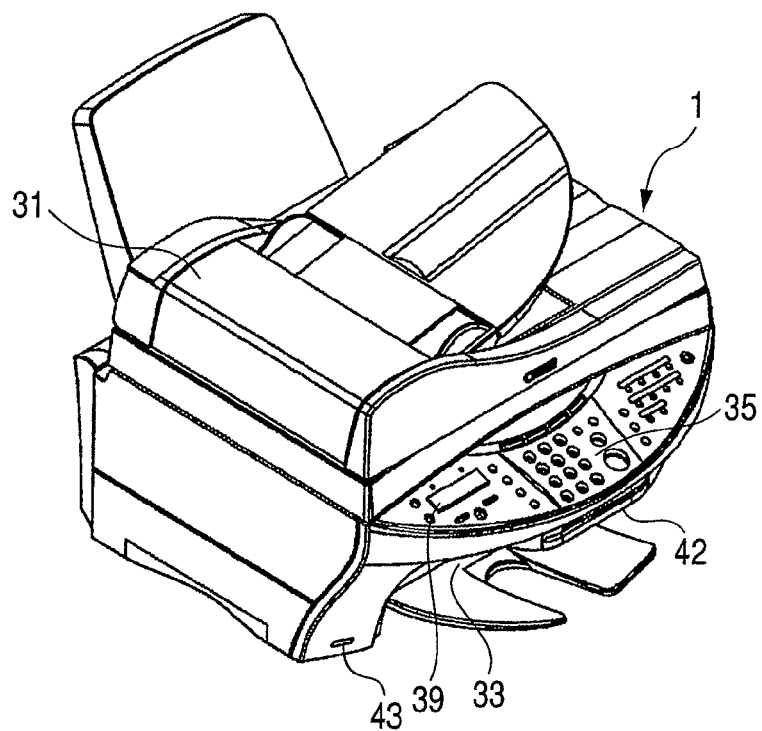
Figure 1B:
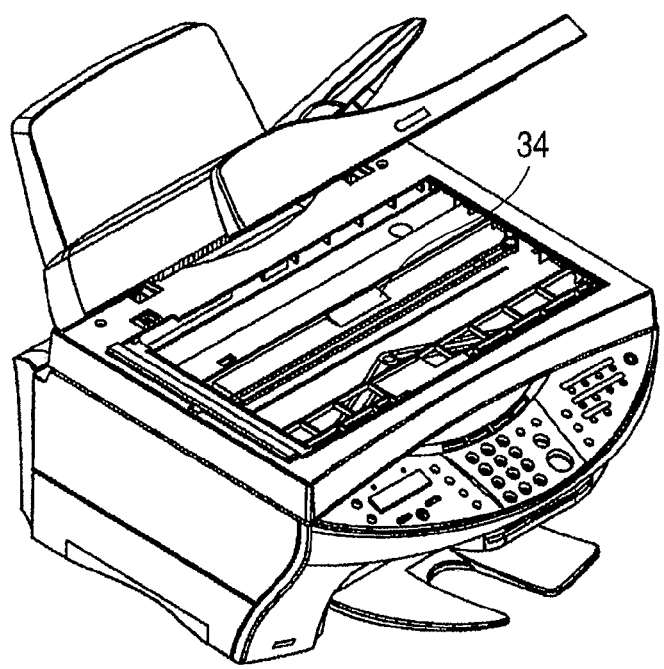

FIGS. 1A and 1B are schematic perspective views of a multi function printer apparatus (hereinafter, referred to as an MFP apparatus) 1 according to the embodiment of the invention. The MFP apparatus 1 has: a function as an ordinary PC printer which receives data from a host computer (PC) and prints; and a function as a scanner. Further, as a function in which the MFP apparatus operates as a single apparatus, the MFP apparatus 1 has: a copying function in which an image read by a scanner is printed by the printer; a function in which image data stored in a storing medium such as a memory card is directly read out and printed; or a function in which image data transmitted from a digital camera is received and printed.

In FIG. 1B, the MFP apparatus 1 has: a reading apparatus 34 such as a flat bed scanner or the like; a printing apparatus 33 of an ink-jet system, an electrophotographic system, or the like; and an operation panel 35 having a display panel 39, various key switches, and the like. A USB port (not shown) for communicating with the PC is provided for a rear surface of the MFP apparatus 1. The MFP apparatus 1 communicates with the PC through the USB port. In addition to the foregoing construction, the MFP apparatus 1 has: a card slot 42 for reading out data from various memory cards; a camera port 43 for communicating data with the digital camera; an automatic document feeder (hereinafter, abbreviated to "ADF") 31 for automatically setting an original document onto a copyboard; and the like.

Figure 2:
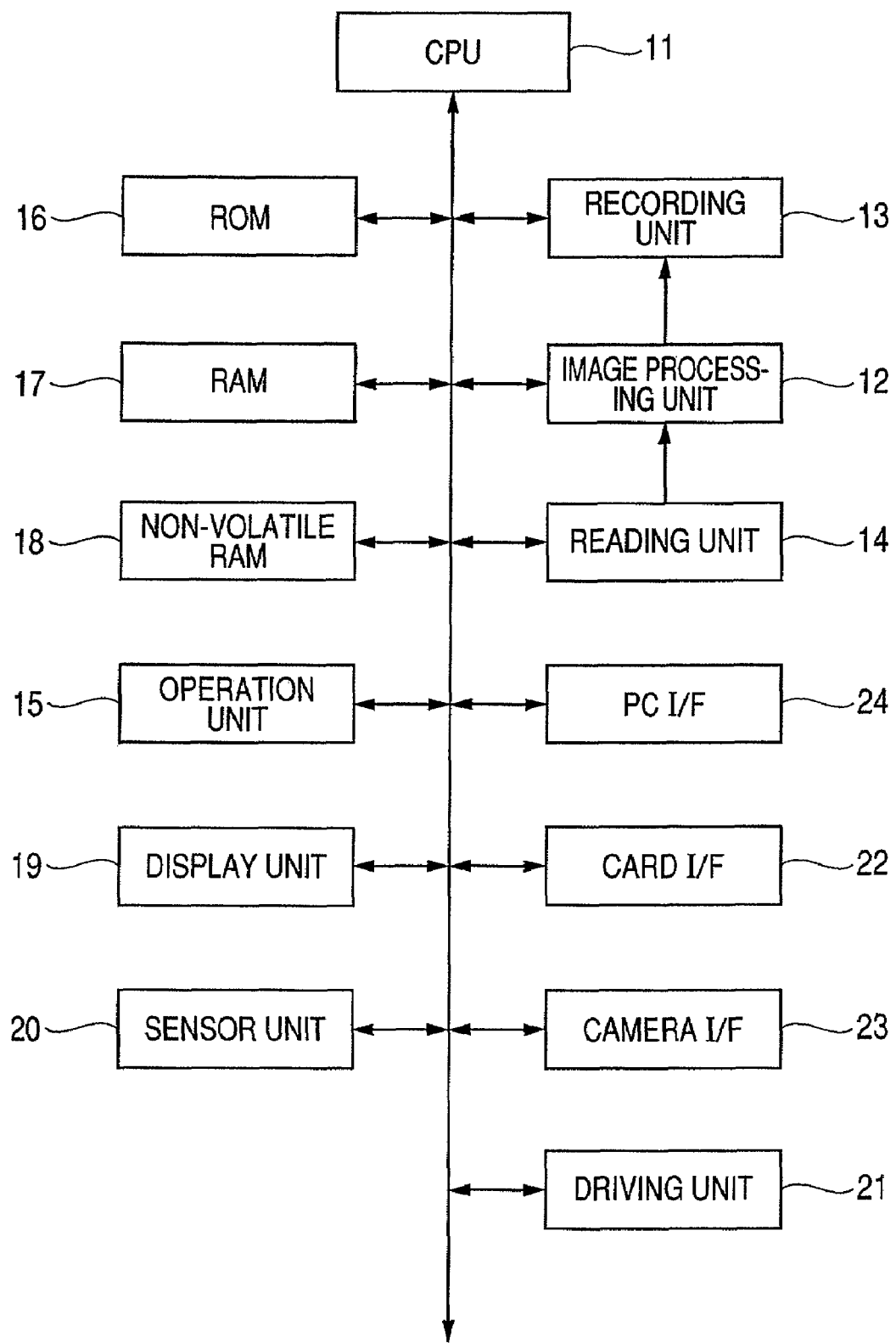
FIG. 2 is a control explanatory diagram of the MFP apparatus.

In FIG. 2, a CPU 11 controls various functions held in an image processing apparatus and executes an image processing program stored in a ROM 16 according to a predetermined operation of an operation unit 15.

A reading unit 14 having a CCD corresponds to the reading apparatus 34 in FIG. 1B, reads the original image, and outputs analog luminance data of red (R), green (G), and blue (B). The reading unit 14 may have a contact type image sensor (CIS) in place of the CCD. If the MFP apparatus 1 has the ADF 31 as illustrated in FIGS. 1A and 1B, since order sheets can be continuously read, it is further convenient.

A card interface (I/F) 22 corresponds to the card slot 42 illustrated in FIGS. 1A and 1B. For example, image data which has been obtained by photographing the original document by a digital still camera (hereinafter, abbreviated to "DSC") and stored in the memory card or the like is read out by the card I/F 22 according to a predetermined operation of the operation unit 15. If necessary, a color space of the image data read out through the card I/F 22 is converted from the color space (for example, YCbCr) of the DSC into a standard RGB color space (for example, NTSC-RGB or sRGB) by an image processing unit 12. Based on header information, the read image data is subjected to various processes necessary for applications such as a resolution conversion into the number of effective pixels and the like as necessary.

A camera interface (I/F) 23 corresponds to the camera port 43 in FIGS. 1A and 1B. The camera I/F 23 is directly connected to the DSC and used to read the image data.

In the image processing unit 12, image processes, which will be described hereinafter, are executed. That is, an image conversion of a read signal value, correcting/improving processes of the image, a conversion from the luminance signal (RGB) into a concentration signal (CMYK), a scaling, a gamma conversion, an error diffusion, and the like, which will be described hereinafter, are executed. The data obtained by the image processes is stored into a RAM 17. When an amount of correction data stored in the RAM 17 reaches a predetermined amount necessary for recording by a recording unit 13 corresponding to the printing apparatus 33 in FIGS. 1A and 1B, the recording operation by the recording unit 13 is executed.

A non-volatile memory 18 is an SRAM or the like which is backed up by a battery. Data peculiar to the image processing apparatus and the like are stored in the RAM 18. The operation unit 15 corresponds to the operation panel 35 in FIGS. 1A and 1B. The operation unit 15 has: a photo direct print start key for selecting the image data stored in the storing medium (memory card) and starting the recording; a key for printing the image onto an order sheet; a key for reading the order sheet; a copy start key in one of a monochromatic copying mode and a color copying mode; a mode key for designating modes such as copy resolution, picture quality, and the like; a stop key for stopping the copying operation and the like; a ten-key for inputting the number of print copies; a registration key; and the like. The CPU 11 detects a depressing state of those keys and controls each unit according to the state.

A display unit 19 corresponds to the display panel 39 in FIGS. 1A and 1B. The display unit 19 has a liquid crystal display unit (LCD) of a dot matrix type and an LCD driver and performs various kinds of display based on control of the CPU 11. The display unit 19 displays a thumbnail of the image data recorded in the storing medium. The recording unit 13 corresponds to the printing apparatus 33 in FIGS. 1A and 1B and has an ink-jet head of the ink-jet system, a general IC, and the like. Under the control of the CPU 11, the recording unit 13 reads out the recording data stored in the RAM 17 and prints and outputs as a hard copy.

A driving unit 21 has a stepping motor for driving a paper feed roller and a paper discharge roller, a gear for transferring a driving force of the stepping motor, a driver circuit for controlling the stepping motor, and the like, in the operation of each of the foregoing reading unit 14 and the recording unit 13.

A sensor unit 20 has a recording paper width sensor, a recording paper presence/absence sensor, an original width sensor, an original presence/absence sensor, a recording medium detecting sensor, and the like. The CPU 11 detects states of the original and the recording paper based on information which are obtained from those sensors.

A PC interface (I/F) 24 is an interface with the PC and the MFP apparatus 1. The MFP apparatus executes the operation such as printing, scanning, or the like from the PC through the PC I/F 24.

At the time of the copying operation, the image data read by the reading apparatus 34 is processed in the MFP apparatus and printed by the printing apparatus 33.

When the copying operation is instructed by the operation unit 15, the reading unit 14 reads the original put on a copyboard. The read data is transmitted to the image processing unit 12, subjected to an image process, which will be described hereinafter, and sent to the recording unit 13, and the printing is executed.

<Image Process>

Figure 3:
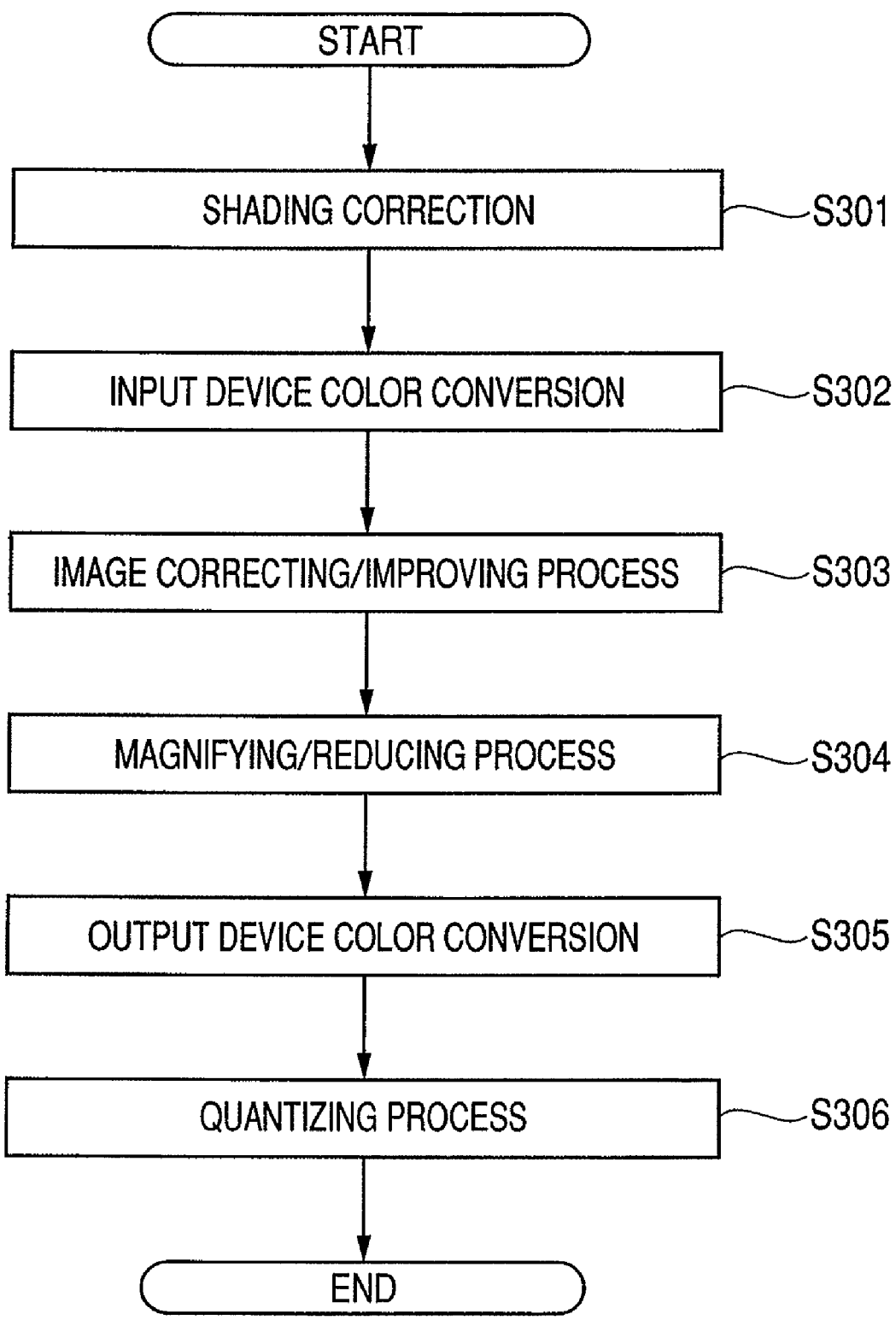
FIG. 3 is a flowchart for an image process of the MFP apparatus.

FIG. 3 is a flowchart for the image process which is executed in the copying mode. Processing steps will be described in detail hereinbelow. However, details of a processing method which are not essential in the present invention are omitted here.

The data which has been read by the reading unit 14 and A/D converted is shading-corrected in order to correct a variation in image pickup elements (or image sensing elements) in step S301.

After that, a color conversion of the input device is performed in S302. Thus, the signal data which is peculiar to the device is converted into a standard color space area such as sRGB defined by IEC (International Electrotechnical Commission), AdobeRGB proposed by Adobe Systems Co., Ltd., or the like. As a converting method, an arithmetic operating system according to a matrix of (3×3) or (3×9), a lookup table system whereby a table in which converting rules have been written is referred to and the converting method is determined based on the proper converting rule, or the like can be mentioned.

Correcting and improving processes are executed to the converted data in S303. As processing contents, an edge emphasizing process for correcting a blur that is caused by the reading, a character improving process for improving discriminating character performance, a process for eliminating a back image projection (coming-out) caused by the reading due to the light irradiation, and the like can be mentioned. It is desirable to execute the processes as a feature of the invention by those processing steps.

In S304, a magnifying/reducing process is executed. When a variable magnification (zooming), an allocation copy for allocating two original images onto one sheet of paper, or the like is designated by the user, the image data is converted into data of a desired magnification. As a converting method, a method such as Bi-Cubic, Nearest Neighbor, or the like is generally used.

In S305, data on a standard color space is converted into signal data that is peculiar to an output device. The embodiment relates to the MFP apparatus of the ink-jet system. In this case, a process for converting the data on the standard color space into ink color data of the colors such as (cyan, magenta, yellow, and black) or the like, is executed. In this conversion, it is sufficient to use a system similar to that mentioned in S302.

Further, in S306, a conversion into the number of levels which can be recorded is executed. For example, in the case of expressing the data by a binary value indicating that an ink dot is discharged or not, it is proper to binarize the data by a quantizing method such as an error diffusion or the like. Thus, the data is converted into the data format in which the printer can record the data. The recording operation is executed based on the data format and the image is formed.

<The Unit of Processing (or Processing Unit)>

Figure 4A:
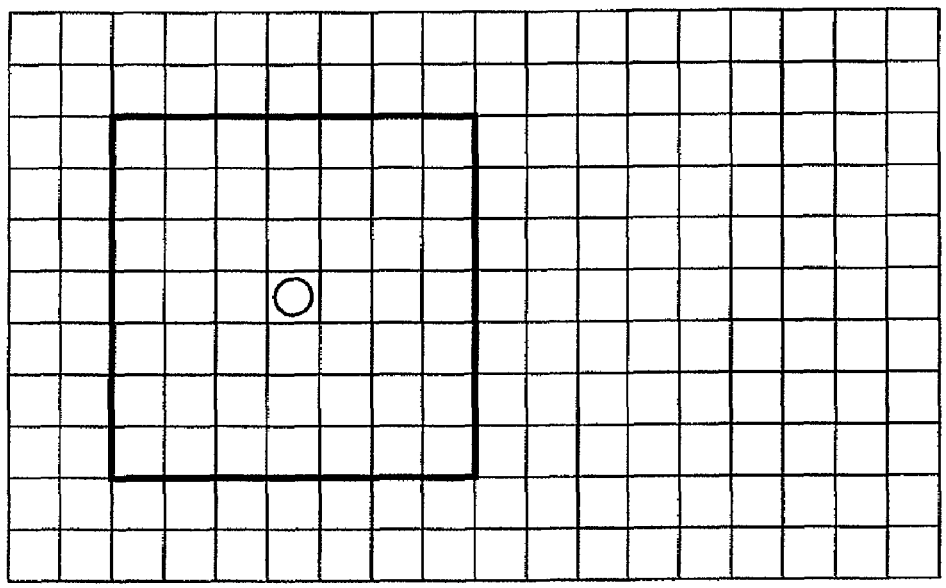
FIGS. 4A and 4B are explanatory diagrams of the unit of processing (or a processing unit).

FIG. 4A is a diagram for describing the processing unit when the process as a feature of the invention is executed.

Figure 4B:
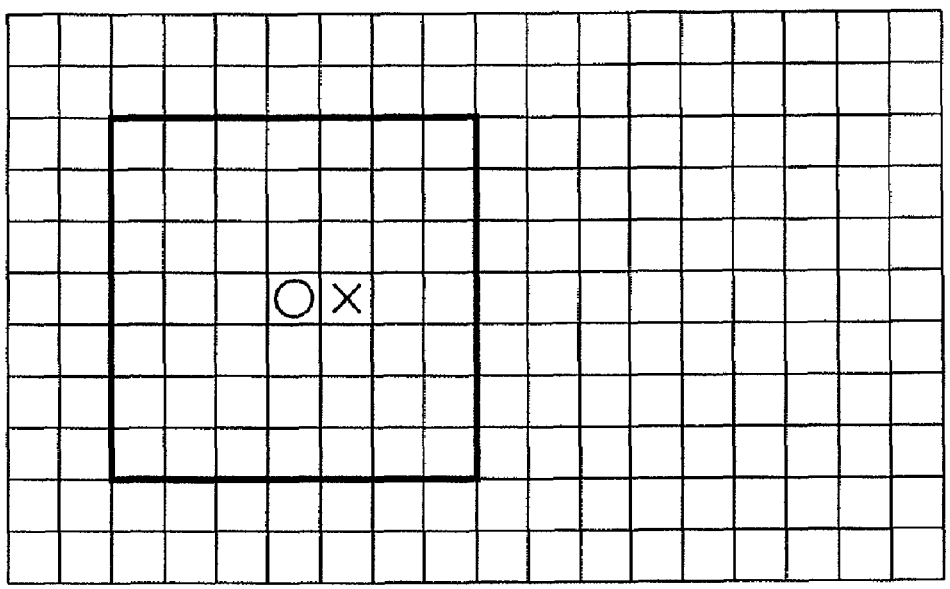

Assuming that the pixel shown by a mark "○" in FIG. 4A is a target pixel (processing target pixel), an area (7×7 area) constructed by (7×7) pixels including the target pixel as shown by a bold line in FIG. 4A is set. The image process for the target pixel is executed by using the image signal in the set (7×7) area. After the process of the target pixel was executed, for example, like a pixel shown by a mark "x" in FIG. 4B, that is, the pixel adjacent to the target pixel, is set to a next target pixel, the (7×7) area is set as described above, and the image process is executed. After that, similarly, the target pixel is sequentially shifted one pixel by one and by setting the (7×7) area each time of the pixel shift, thereby correcting all target pixels.

Figure 5:
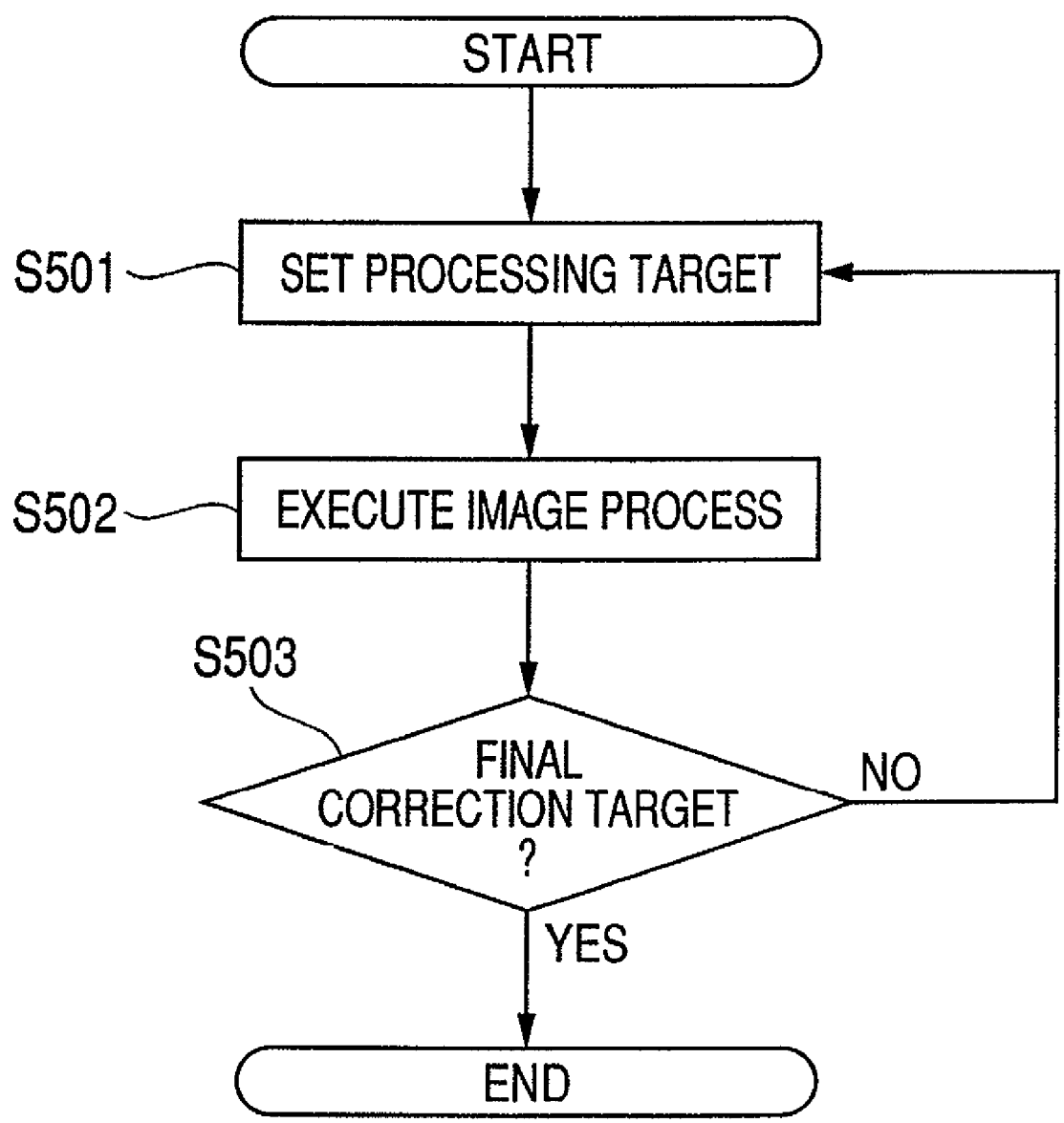
FIG. 5 is a flowchart for movement of the unit of processing (or the processing unit).

FIG. 5 is a diagram for describing a flow for movement of the processing unit. In S501, the processing target is set. Just after the start, the first processing target is set. If the processing routine is returned from S503 to S501, the next processing target is set.

In S502, the image process is executed. Although details will be described hereinafter, a plurality of pixels (7×7 area in the above description) including the processing unit is set as described above. The image process as a feature of the invention is executed.

In S503, a final correcting target is discriminated, that is, whether or not the processing unit is a final processing unit is discriminated. If the processing unit is not the final processing unit (NO in S503), the processing routine is returned to S501. If the processing unit is the final processing unit (YES in S503), the processing routine is finished.

The image pickup elements of the CCD or the CIS used in the reading apparatus 34 described in FIG. 1B and the reading unit 14 illustrated in FIG. 2 does not always read a pixel equivalent of the original by one pixel thereof. In the embodiment, the case of reading a range of about six pixels on the original is presumed. But, even in a case of the six pixels, reflection light from the original which enters the image pickup elements is exerted to various influences depending on a floating of the original from the copyboard, an irregular surface of the original, or the like. Therefore, actually, there is also a case where a range over six pixels is read. That is, the reflection light of one pixel on the original exerts an influence on a plurality of image pickup elements, causing the blur of the edge mentioned in the description of the related art, and deteriorating the sharpness. In the embodiment, since the range of about six pixels is assumed to be the reading range, a reference area of (7×7) pixels is used. It is desirable to properly set the reference area according to performance of the image pickup element such as the number of pixels of the image pickup element on which one pixel on the original image influences, spot diameter, the number of blur pixels, MTF, or the like.

<Definition of Words>

Prior to describing the following embodiments, a definition and a limitation of words will be described hereinbelow.

Fluctuation information denotes a state of a luminance change in the target area and is expressed by the number of fluctuating times and a fluctuation amount, which will be described hereinbelow.

The number of fluctuating times will be described as the number of sign changing times (the number of zero-crossing times) of an increase/decrease of a signal value in the luminance change in the target area. However, the number of fluctuating times is not limited to such an example but is defined as a value showing a frequency of a change in value regarding the image signal in the target area. That is, the number of fluctuating times may be one of the number of zero-crossing points or a spatial frequency of a linear differentiation of the value regarding the image signal in the target area, the number of black and white changing times after the binarization, and the like.

The fluctuation amount will be described as an absolute value (edge amount) of a difference of the luminance to the target pixel. However, the fluctuation amount is not limited to such an example but is defined as a value showing a difference (magnitude) of a change such as the absolute value of the linear differentiation, of the value regarding the image signal of the target pixel, or a value representatively showing a difference (magnitude) of a change in value regarding the image signal in the target area.

A fluctuation acceleration will be described as a value showing a difference further obtained from the difference of the luminance in the target area in the following embodiment. However, the fluctuation acceleration is not limited to such an example but is defined as a value showing an acceleration of the change such as a quadratic differentiation, of the value regarding the image signal in the target area, or the like.

"A correction intensity is adaptively set" is defined as follows: different correction intensities are set every value in at least a part of the value areas in which the number of fluctuating times, the fluctuation amount, the fluctuation acceleration, or the saturation defined above can be set.

Details of the embodiments will now be described hereinbelow. Although a description will be made as an example on the assumption that the range where the image signal can be set lies within a range from 0 to 255, the range of the image signal is not limited to such an example. It is desirable to set such a range so as to be suitable for the MFP apparatus and the image process.

Embodiment 1

The embodiment 1 will be described with respect to an example in which the foregoing problems are solved and an edge deterioration is suppressed in consideration of a bleeding ratio of each concentration. In the embodiment, if the image has been recorded by a color whose total ink amount is large, a bleeding of the ink increases, an edge portion is damaged, and the image deteriorates. Therefore, control to prevent such a drawback is made. The following method is considered as control to prevent the edge deterioration. That is, a concentration corresponding to a luminance of the pixel obtained after the edge emphasis correction is made once is obtained. The edge emphasis correction is again arithmetically operated so that the concentration whose total ink amount is small is obtained in a portion adjacent to the concentration whose total ink amount is large. However, according to such control, since it is necessary to retry the arithmetic operation for the edge emphasis correction, an arithmetic operation amount increases and a time necessary for the edge emphasis correction becomes long. In the embodiment, therefore, in place of directly arithmetically operating the pixel concentration after the edge emphasis correction, a maximum luminance value and a minimum luminance value of the pixels arranged in the edge direction among the pixels in a predetermined range around the target pixel as a center are obtained and the minimum luminance value is approximately used as a luminance of the pixel obtained after the edge emphasis correction. If the minimum luminance value is adjacent to the luminance corresponding to the concentration whose total ink amount is large, an edge emphasizing condition is changed so that the target pixel is corrected to the maximum luminance value side at the time of the edge emphasis correction. A flowchart having the edge emphasis correction and the edge deterioration suppression control will be described hereinbelow. However, if the user does not worry about an increase in arithmetic operation amount, the following method may be used. That is, the concentration corresponding to the luminance of the pixel obtained after the edge emphasis correction is obtained. The edge emphasis correction is made so that the concentration whose total ink amount is small is obtained in the portion adjacent to the concentration whose total ink amount is large.

Figure 16:
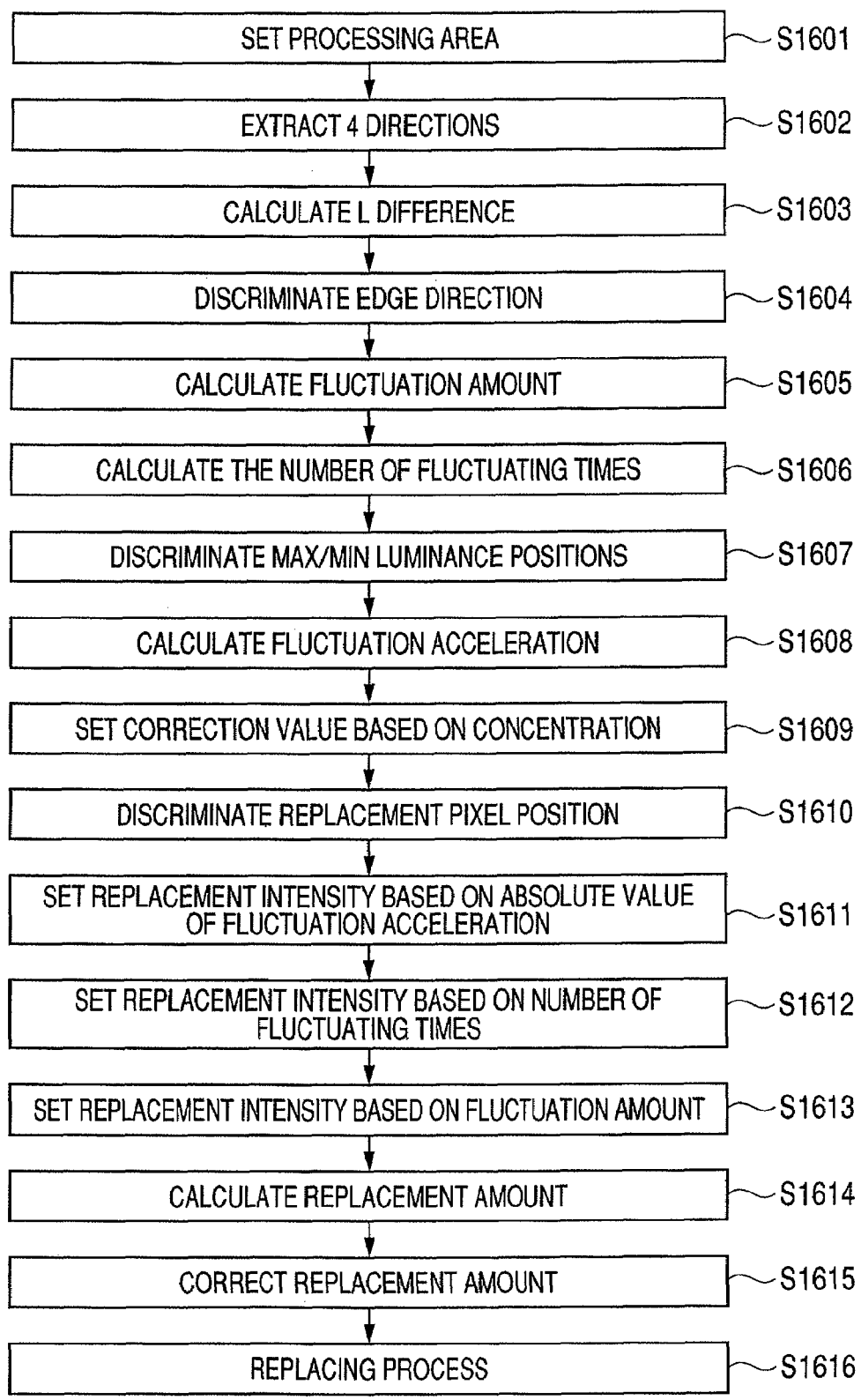
FIG. 16 is a processing flowchart in an embodiment 1.

FIG. 16 is a flowchart in the embodiment. An explanation will be made hereinbelow along processing steps in the flowchart.

<S1601: Setting of Processing Area>

In the image constructed by the multi-value image signal of RGB, a processing area of the (7×7) area constructed by 7 pixels in the lateral direction and 7 pixels in the vertical direction around the target pixel as a center is set. A luminance L is calculated from each pixel value in the processing area by the following equation (1), thereby forming a processing area of the (7×7) area for L.

$$L=(R+2\times G+B)/4 \quad (1)$$

Although the luminance L calculated by the equation (1) is used in the embodiment, another luminance can be also applied. For example, $L^*$ of a uniform color space $L^*a^*b^*$ may be used as a luminance or Y of YCbCr may be used as a luminance.

FIG. 8A1 illustrates the luminance when a black vertical line in a white background is read in the lateral direction. FIG. 8A2 illustrates the luminance when dots arranged in the lateral direction in the white background are read in the lateral direction. For simplifying the description, 12 pixels are used in place of 7 pixels in FIGS. 8A1 and 8A2.

<S1602: Extraction in Four Directions>

As illustrated in FIG. 9, seven pixels in each of four directions in total of one lateral direction, one vertical direction, and two oblique directions are extracted from the processing area of L formed in S1601.

<S1603: Calculation of L Difference>

Figure 10:
FIG. 10 is an explanatory diagram of an L difference.

A difference Grd of L for each of 5 pixels in every direction is calculated as illustrated in FIG. 10 by using the following equation (2) from L's in the four directions extracted in S1602. A pre-pixel of a pixel L(i) is assumed to be L(i−1) and a post-pixel is assumed to be L(i+1).

$$Grd(i)=L(i+1)-L(i-1) \quad (2)$$

A calculating method of the L difference is not limited to such a method but a difference between the adjacent pixels can be used or a difference between the pixels which are further away from the pixels before and after the target pixel described above may be used.

FIGS. 8B1 and 8B2 illustrate Grd obtained by applying the equation (2) to L in FIGS. 8A1 and 8A2.

<S1604: Discrimination of Edge Direction>

In Grd's in the four directions calculated in S1603, Grd absolute values in the four directions of the target pixel are obtained. The direction in which the maximum Grd absolute value is obtained among the Grd absolute values in the four directions is determined to be the edge direction of the target pixel.

<S1605: Calculation of Fluctuation Amount>

With respect to the edge direction determined in S1604, the maximum absolute value is calculated as a fluctuation amount (edge amount) of the target pixel from the 5 pixels of the Grd's in the edge direction calculated in S1603. It will be understood that the larger the fluctuation amount is, the sharper the edge is and that the smaller the fluctuation amount is, the closer the edge is to a flat shape.

<S1606: Calculation of the Number of Fluctuating Times>

The total number of fluctuating times in the four directions is calculated from the Grd's in the four directions calculated in S1603. In the embodiment, the number of changing times when the sign of the Grd changes from + to − or from − to + and the number of changing times when the sign of the Grd changes from + to 0 and then changes to − in the next pixel or it changes from − to 0 then changes to + in the next pixel are calculated as the number of fluctuating times (the number of zero-crossing times) of the target pixel.

<S1607: Discrimination of Maximum and Minimum Luminance Positions>

With respect to the edge direction determined in S1604, the pixel positions of the maximum L and the minimum L are discriminated from the 7 pixels of L's in the edge direction among the 4 directions extracted in S1602.

<S1608: Calculation of Fluctuation Acceleration>

With respect to the edge direction determined in S1604, a fluctuation acceleration Lap for the 3 pixels is calculated from the Grd's in the edge direction calculated in S1603. A calculating method of the fluctuation acceleration is based on the following equation (3). A pre-pixel of a pixel Grd(i) is assumed to be Grd(i−1) and a post-pixel is assumed to be Grd(i+1). FIGS. 8C1 and 8C2 illustrate the Lap obtained by applying the equation (3) to the Grd in FIGS. 8B1 and 8B2.

$$Lap(i)=Grd(i+1)-Grd(i-1) \quad (3)$$

The calculating method of the fluctuation acceleration is not limited to such a method but the fluctuation acceleration can be also calculated from a difference between the neighboring values of the Grd.

<S1609: Setting of Correction Value Based on Concentration>

In this step, a process for improving reproducibility of the edges on an output image by changing the Lap(i) value obtained in S1608 based on the concentration after the recording is executed. A correcting method is shown in the following equation (4). By subtracting a correction value BLUR from the Lap(i) value obtained in S1608, the Lap(i) is updated to Lap'(i), thereby realizing the correcting method. Since the correction value BLUR is a value which has been predetermined according to the luminance, it is referred to as BLUR (luminance) hereinbelow. In the embodiment, a value of the BLUR (luminance) according to each luminance has been stored in a table.

$$Lap'(i)=Lap(i)-BLUR(luminance) \quad (4)$$

The correction value BLUR (luminance) will be described hereinbelow. When the correction value is large, Lap'(i) has a small value. Therefore, the correction value is liable to be corrected to the minimum luminance side in S1610, which will be described hereinbelow, so that the edge portion is liable to become white. The feature of the embodiment will now be described. In the embodiment, a replacement pixel position is discriminated in S1610, which will be described hereinbelow, in order to make the edge emphasis. The pixel of one of the maximum L and the minimum L is selected as a replacement pixel position. When the minimum L is selected in S1610, if the correction is most intensively made by the intensity setting in S1611 to S1613, which will be described hereinbelow, the target pixel is replaced by the value of the pixel of the minimum L. As will be also understood from FIG. 13, in the embodiment, a point where the total ink amount is largest is located on the side of the high concentration. In other words, the point of the maximum total ink amount is located on the side of the low luminance. The target pixel is replaced by the value of the pixel of the minimum L. If the minimum L is the luminance at which the total ink amount is largest, the target pixel is recorded at the concentration at which the bleeding ratio is large and the total ink amount is largest. Similarly, if the replacement pixel position is determined to be the minimum L, the minimum L is the luminance near the point of the maximum total ink amount, and the correction intensity in S1611 to S1613 is close to the maximum; the value of the target pixel obtained after the edge emphasis correction is a value near the minimum L. Therefore, in the embodiment, the minimum L is approximately used as a luminance of the target pixel obtained after the edge emphasis correction. That is, in the embodiment, the method of obtaining the concentration of the target pixel obtained after the edge emphasis correction corresponds to the obtainment of the minimum L. If the concentration of the target pixel obtained after the edge emphasis correction is close to the point of the maximum total ink amount, the target pixel is recorded at the concentration of the large bleeding ratio. In order to prevent such a situation, the replacement pixel position obtained by the edge emphasis correction is changed to the maximum L so that the target pixel is replaced by the maximum L. A process for this purpose is S1608 and can be realized by predetermining the value of BLUR (luminance) as illustrated in FIG. 6.

Figure 13:
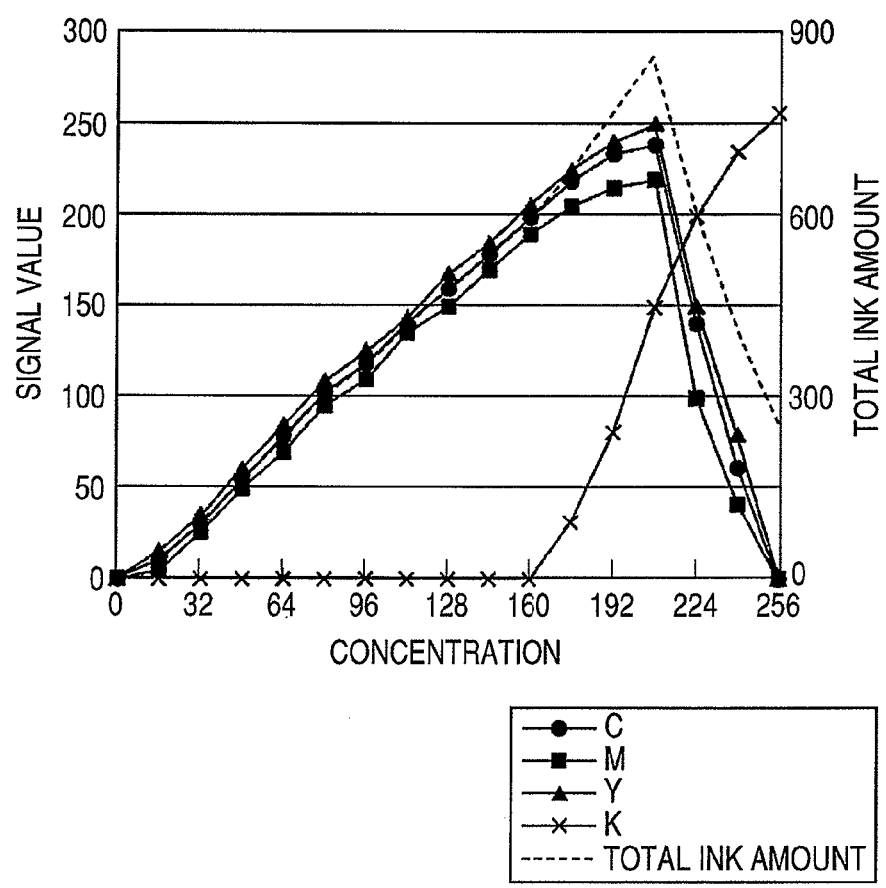
FIG. 13 illustrates a use example of the ink of a gray line.
Figure 14:
FIG. 14 is a diagram for thickening a thin line by a concentration.

FIG. 6 illustrates an example of a table of the correction value BLUR (luminance). In the graph, an axis of abscissa indicates the luminance and an axis of ordinate indicates the value of the BLUR (luminance) as a correction value according to each luminance. The recording apparatus is an ink-jet recording apparatus using the ink of four colors of cyan, magenta, yellow, and black described in the related art. The forming method of the gray line described in FIG. 13 is presumed and the example of the table based on it is illustrated. The gray line is a gray line (stripe) which is recorded by continuously changing the concentration from the low concentration (white) to the high concentration (black) in the color mixture using four colors in FIG. 13. The minimum L in the edge direction which is obtained in S1607 is the luminance shown on the axis of abscissa in FIG. 6. As shown at a point A in FIG. 6, at the concentration corresponding to the luminance in which the value of BLUR (luminance) is large, the bleeding ratio of the ink, which will be described hereinafter, is high. That is, at the luminance in which the bleeding ratio of the ink is high, the value of the BLUR (luminance) as a correction value is set to a large value. This is because of the following reasons. When considering the case of recording the edge portion of a character, if the minimum L determined in S1607 is equal to the luminance near the point A and the pixel of the minimum L is selected as a replacement pixel position in S1610, which will be described hereinafter, the pixel obtained after the correction is recorded at the concentration near the high bleeding ratio, so that the edge becomes blur and the character is liable to be damaged. Therefore, by increasing the BLUR (luminance), correction is made so that the edge portion of the character portion becomes white in S1611, which will be described hereinafter, thereby preventing the deterioration of the character caused by the bleeding of the ink.

As a method of obtaining the table of the BLUR (luminance), an image of a gray gradation of a thin line as illustrated in FIG. 7A is output by the recording apparatus, thereby obtaining an output result as illustrated in FIG. 7B. It is desirable to scan the output image, obtain a scanning result as a digital value, and obtain the number N of pixels for a distance at a point where the concentration is decreased from the center concentration value at the center by a predetermined ratio. In the embodiment, the number N of pixels is called a bleeding ratio of the ink. In the case of the concentration of the large bleeding, N is large. When the bleeding is small, N is small. It is sufficient to set the correction value BLUR (luminance) with reference to the value of N of each predetermined concentration.

Although the table of the correction value BLUR (luminance) may be previously stored into the ROM of the copying apparatus, such a construction that the user is allowed to output predetermined patterns as illustrated in FIGS. 7A and 7B by a user interface and the patterns are scanned can be used. Thus, a variation of the ink discharge of the recording apparatus or the like can be also absorbed and the output of higher picture quality can be provided by the user.

<S1610: Discrimination of Replacement Pixel Position>

The replacement pixel position is discriminated from the pixel positions of the maximum L and the minimum L determined in S1607 and the fluctuation acceleration Lap' calculated in S1609. As illustrated in FIGS. 8C1 and 8C2, there is such a tendency that when the sign of Lap is equal to + a magnitude of the value of L of the target pixel is closer to the minimum L than the maximum L, and when the sign of Lap is equal to −, the magnitude of the value of L of the target pixel is closer to the maximum L than the minimum L. Therefore, as shown in the following Table 1, by determining the replacement pixel position for a sign of Lap', the target pixel can be replaced by the proper replacement target pixel.

Although the replacement pixel position is determined as shown in Table 1 in the embodiment, a handling method of the edge center where Lap' of the target pixel is equal to 0 is not limited to that shown in Table 1 (when the sign of Lap' of target pixel is equal 0, the replacement pixel position is decided by a total Lap sign of pixels before and after the target pixel as shown in Table 1). If Lap' of the target pixel is equal to 0, the replacement pixel position can be set to the pixel position of the maximum L or, contrarily, can be set to the pixel position of the minimum L. Although the pixel positions of the maximum L and the minimum L in the edge position have been used, the pixel positions of the maximum L and the minimum L around the target pixel may be used without considering the edges.

TABLE 1

| Sign of Lap' of target pixel | + | − | 0 | 0 | 0 |
|---|---|---|---|---|---|
| Total Lap sign of pixels before and |  |  | + | − | 0 |

TABLE 1-continued

| after the target Replacement pixel position | Min. L | Max. L | Min. L | Max. L | Max. L |
|---|---|---|---|---|---|

(a) ... Sign of Lap' of target pixel, (b) ... Sign of total Lap of pixels before and after the target pixel, (c) ... Replacement pixel position, (d) ... Min. L, (e) ... Max. L <S1611: Setting of Replacement Intensity Based on Absolute Value of Fluctuation Acceleration>

Figure 19A:
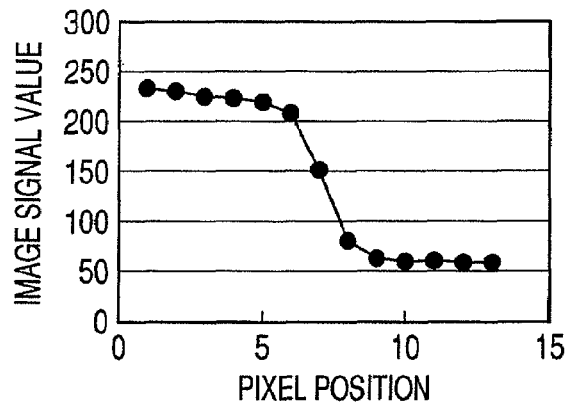
FIGS. 19A, 19B, and 19C are explanatory diagrams of an edge emphasis.
Figure 19B:
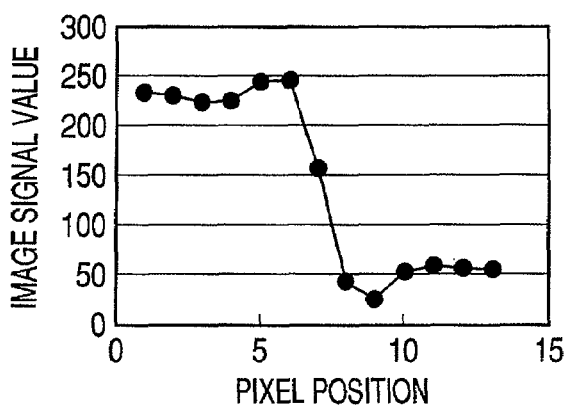
Figure 19C:
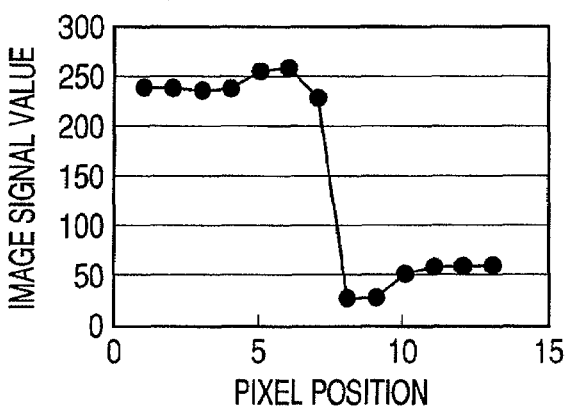
Figure 20A:
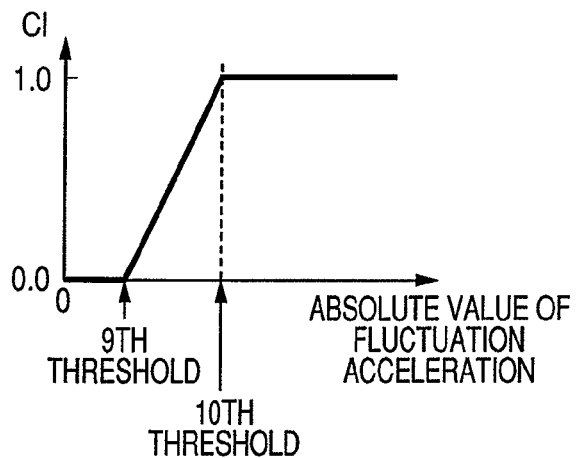
FIGS. 20A, 20B, and 20C are explanatory diagrams of a replacement intensity setting method.

A replacement intensity C1 is adaptively set according to the absolute value of the fluctuation acceleration calculated in S1608. If an original image of FIG. 19A is subjected to traditional edge emphasis by filter, FIG. 19B is obtained. By setting C1 to (C1=1) irrespective of the absolute value of the fluctuation acceleration, FIG. 19C can be obtained from FIG. 19B. However, in this case, there is a case where if C1 is always set to (C1=1), jaggies become conspicuous. Therefore, in this embodiment, a process of replacement by which the edge can be emphasized more than that in FIG. 19B while suppressing the jaggies will be described. FIG. 20A is a diagram for describing CI setting in S1611. An axis of abscissa indicates the absolute value of the fluctuation acceleration and an axis of ordinate indicates C1. In the case of the fluctuation acceleration smaller than the 9th threshold value near the edge center, C1 is set to 0 for no replacement. The reason why the setting is made for no replacement near the edge center is that the occurrence of the jaggies is made inconspicuous. In the case of the absolute value of the fluctuation acceleration larger than the 10th threshold value away from the edge center, C1 is set to 1 for replacement. In the case of the absolute value of the fluctuation acceleration which is equal to or larger than the 9th threshold value and is equal to or less than the 10th threshold value, the different value of C1 is adaptively set every absolute value of the fluctuation acceleration in such a manner that when the fluctuation acceleration absolute value=the 9th threshold value, C1=0 and when the fluctuation acceleration absolute value=the 10th threshold value, C1=1 in order to make the switching of the process inconspicuous. Specifically speaking, C1 can be adaptively set with reference to FIG. 20A by the following equation (5).

$$C1=\text{(fluctuation acceleration absolute value−the 9th threshold value)}/\text{(the 10th threshold value−the 9th threshold value)} \quad (5)$$

<S1612: Setting of Replacement Intensity Based on the Number of Fluctuating Times>

Figure 20B:
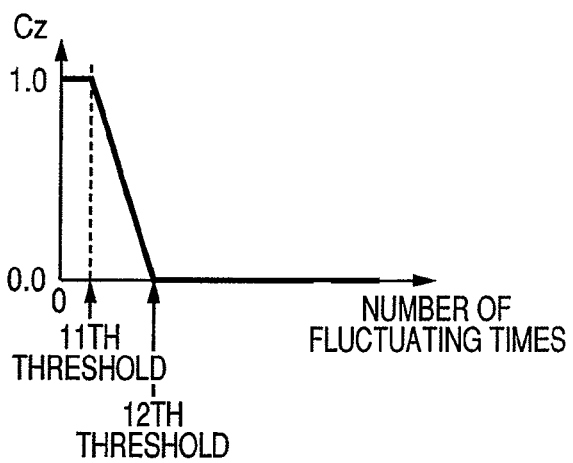

A replacement intensity Cz is adaptively set according to the number of fluctuating times calculated in S1606. Cz is adaptively set by characteristics of FIG. 20B by using the 11th and 12th threshold values. In the case of a bold line in which the number of fluctuating times is smaller than the 11th threshold value, Cz is set to (Cz=1). In the case of a thin line or a dot in which the number of fluctuating times is larger than the 12th threshold value, Cz is set to (Cz=0). When the number of fluctuating times is equal to or larger than the 11th threshold value and is equal to or less than the 12th threshold value, Cz can be adaptively set by the following equation (6).

$$Cz=\text{(the 12th threshold value−the number of fluctuating times)}/\text{(the 12th threshold value−the 11th threshold value)} \quad (6)$$

<S1613: Setting of Replacement Intensity Based on Fluctuation Amount>

Figure 20C:
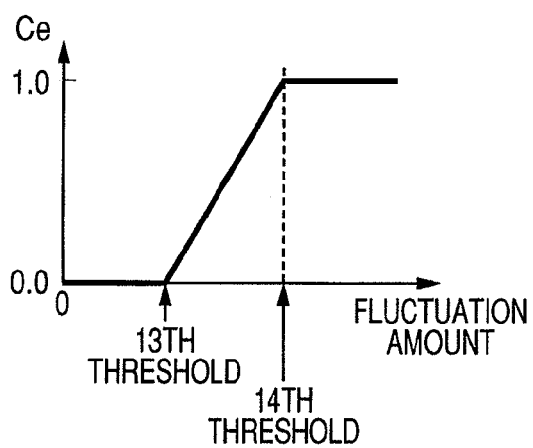

A replacement intensity Ce is adaptively set according to the fluctuation amount calculated in S1605. Ce is adaptively set by characteristics of FIG. 20C by using the 13th and 14th threshold values. When the fluctuation amount is smaller than the 13th threshold value, Ce is set to (Ce=0). When the fluctuation amount is larger than the 14th threshold value, Ce is set to (Ce=1). When the fluctuation amount is equal to or larger than the 13th threshold value and is equal to or less than the 14th threshold value, Ce can be adaptively set by the following equation (7).

$$Ce=\text{(the fluctuation amount−the 13th threshold value)}/\text{(the 14th threshold value−the 13th threshold value)} \quad (7)$$

<S1614: Calculation of Replacement Amount>

The replacement amount is calculated by using the pixel value of the replacement pixel position determined in S1610. The RGB values at the replacement pixel position determined in S1610 are extracted from the (7×7) area of RGB set in S1601. Assuming that the target pixel value is set to N0, the pre-pixel value at the replacement pixel position is set to C0, and the replacement amount is set to ΔC, ΔC can be calculated by using the following equation (8).

$$\Delta C = C0 - N0 \quad (8)$$

<S1615: Correction of Replacement Amount>

The replacement amount ΔC calculated in S1614 is corrected by the replacement intensities C1, Cz, and Ce set in S1611 to S1613. A corrected replacement amount ΔC' is calculated by using the following equation (9).

$$\Delta C' = Ce \times C1 \times Cz \times \Delta C \quad (9)$$

<S1616: Replacing Process>

By adding the replacement amount ΔC' calculated in S1615 to the target pixel value N0 as shown in the following equation (10), a target pixel value Nc in which the edge has been emphasized by the replacement is calculated.

$$Nc = N0 + \Delta C' \quad (10)$$

As described above by using the processing flow, according to the first embodiment of the invention, by reflecting the bleeding ratio to the replacing process in consideration of the bleeding ratio of each ink concentration, particularly, the damage or the like of the character due to the bleeding which is liable to occur in the ink-jet MFP is suppressed and the more desirable image can be provided to the user. If the user does not worry about an increase in arithmetic operation amount, the following method can be also used. First, in the first edge emphasis correction, BLUR (luminance) is set to 0 in the equation (4) in S1609, the arithmetic operation of up to S1616 is executed, and the pixel value after the edge emphasis correction is obtained. Further, the concentration (or luminance) of the pixel value is obtained. The value of BLUR (luminance) is obtained from the concentration (or luminance) of the pixel value by the table of FIG. 6. The obtained BLUR (luminance) value is substituted into the equation (4) in S1609, the conditions of the edge emphasis correction are changed, and the edge emphasis correction of up to S1616 is made again, that is, the second edge emphasis correction is made. Thus, the concentration corresponding to the luminance of the pixel obtained after the edge emphasis correction was made is obtained once and the edge emphasis correction can be again arithmetically operated so that the concentration whose total ink amount is small is obtained at a point near the concentration whose total ink amount is large.

Embodiment 2

In the second embodiment, besides the correction of the bleeding ratio by the ink concentration mentioned in the above embodiment 1, a measure for a speed raising process which is used in the ink-jet recording apparatus will be described. The correction by the ink concentration is similar to that of FIG. 16 in the embodiment 1. The correction regarding the switching of the ink which is used in the second embodiment can be realized by modifying the process of S1609.

Figure 15:
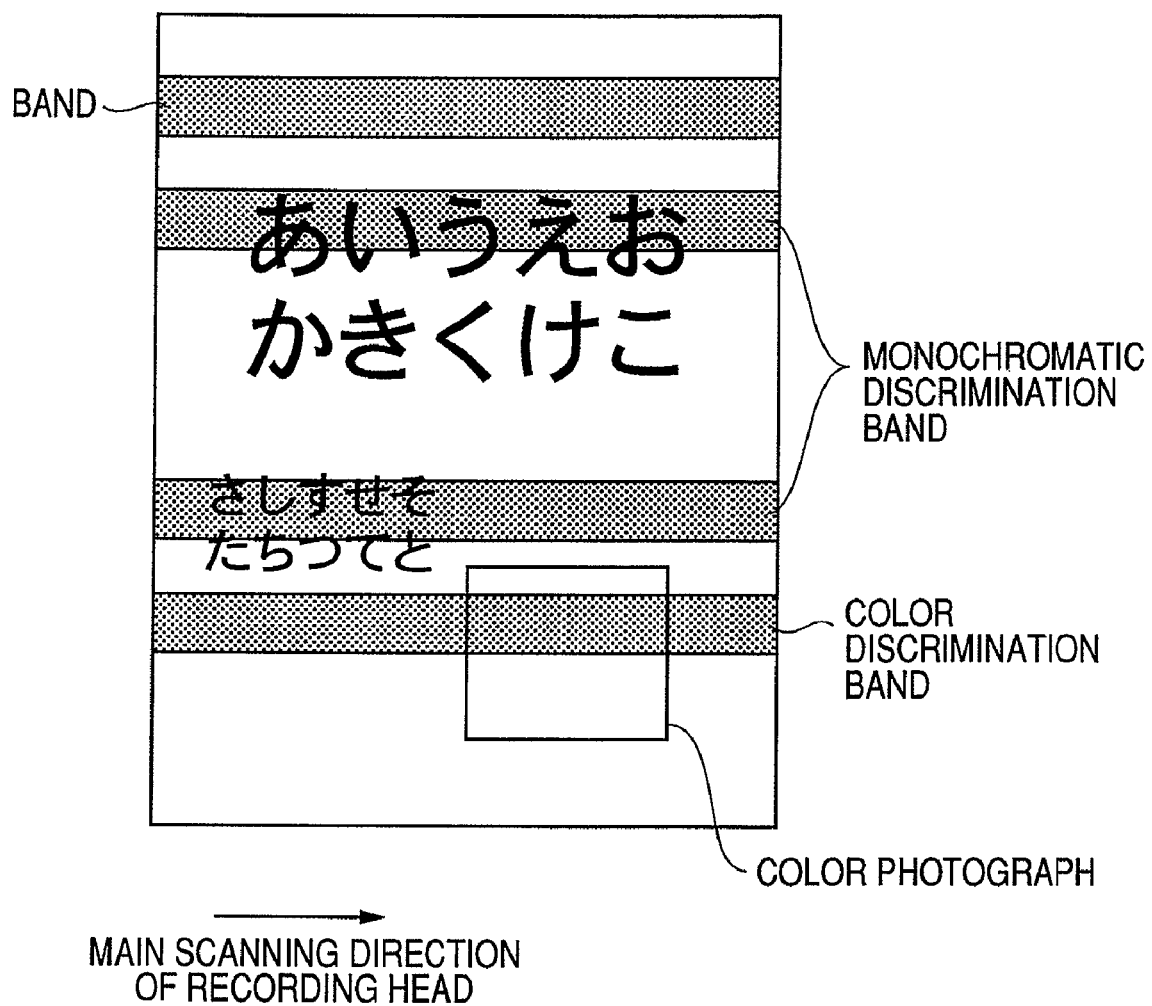
FIG. 15 is a diagram for describing a concept of a band.
Figure 18:
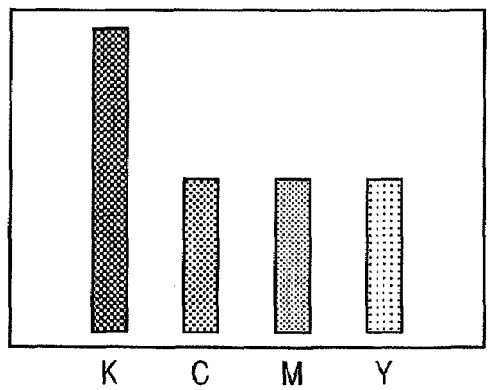
FIG. 18 is a diagram of a recording head.

FIG. 18 is a diagram illustrating ink discharge nozzles of the recording apparatus in the embodiment of the invention. Since the number of nozzles for discharging the black ink is larger than the number of nozzles for discharging the color ink, it will be understood that a length of nozzle array is long. Thus, the high-speed recording can be realized when only the black ink is used in a monochromatic print mode. Particularly, a large effect is provided in the realization of the high printing speed of a monochromatic text document, or the like. Upon printing of a document in which a monochromatic image and a color image exist mixedly such as a document in which black characters, a photograph or an insertion picture exist mixedly, and the like, it is desirable to use an ordinary recording method whereby a monochromatic area is recorded by the black-ink nozzles and a color image containing a color image is recorded by using both of the black ink and color ink. In such a case, as illustrated in FIG. 15, the certain number of rasters in the main scanning direction of the head called a band is regarded as one unit. Whether the band is recorded only by the black ink or is recorded by both of the black ink and the color ink is discriminated.

Such a using ink discriminating process is executed in S303 in the image processing flow of FIG. 3 of the embodiment 1. The table in S306 is switched according to its discrimination result. It is desirable to convert the data into the data of only the black ink if it is determined that the band is a monochromatic band.

Figure 17:
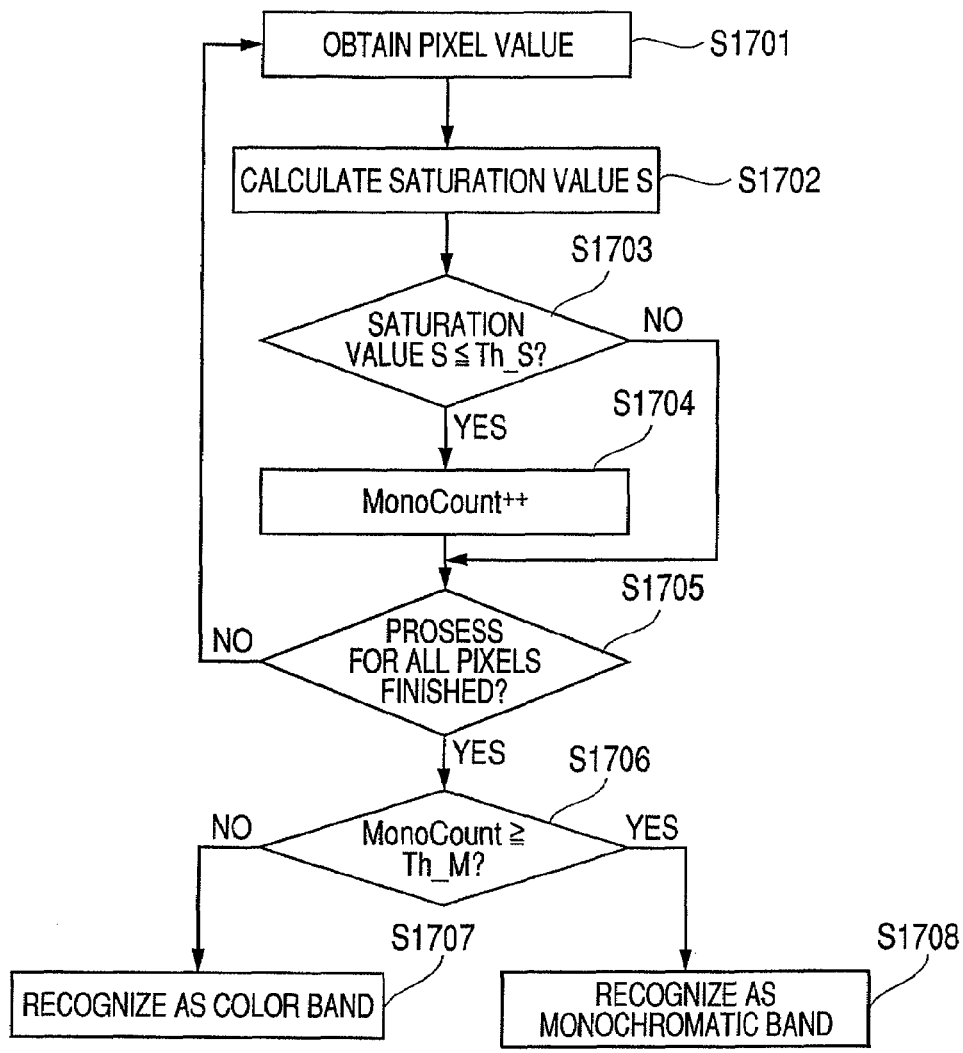
FIG. 17 is a flowchart for a using ink discriminating process in an embodiment 2.

Subsequently, the using ink discriminating process will be described with reference to FIG. 17. FIG. 17 is a flowchart for executing the using ink discriminating process of the band. Each processing step will now be described.

<S1701: Obtainment of Pixel Signal Value>

The pixel value in the target band is obtained. If the reading is executed by using the scanner, the image signal is generally a signal of the RGB format.

<S1702: Calculation of Saturation Value>

A saturation value is calculated from the pixel signal value obtained in S1701. First, a Ca value and a Cb value are obtained by using the following equations (11-1) and (11-2).

$$Ca=(R-G)/2 \tag{11-1}$$

$$Cb=(R+G-2B)/4 \tag{11-2}$$

After that, the Ca and the Cb obtained as mentioned above are converted into a saturation by the following equation (12), thereby obtaining a saturation value S of the target pixel.

$$S=(Ca*Ca+Cb*Cb)^{\wedge}(1/2) \tag{12}$$

<S1703: Discrimination about Achromatic Pixel>

The saturation value S of the pixel obtained in S1702 is compared with a discrimination threshold value Th_S which has been prepared. If the saturation value S is equal to or less than the threshold value (YES in S1703), the pixel is determined to be an achromatic pixel. If the saturation value S is larger than the threshold value (NO in S1703), the pixel is determined to be a color pixel.

<S1704: Increment of Achromatic Counter>

Only when it is determined in S1703 that the pixel is the achromatic pixel, the processing routine advances to S1704 and a count value of a counter MonoCount is increased by one. Although not particularly disclosed, the counter MonoCount has already been initialized to 0 prior to starting the present processing flow.

<S1705: End of Discrimination about Pixel>

Whether or not the processes of S1701 to S1704 have been finished is discriminated with respect to all pixels in the block. If the processes for all of the pixels are not completed yet, the processing routine is returned to S1701 and the similar processes are executed.

<S1706: Discrimination about Using Ink>

After completion of the processes of S1701 to S1705, the using ink of the target block is discriminated by using the counter MonoCount. The count value of the counter MonoCount is compared with a discrimination threshold value Th_M which has been prepared in S1706. If the count value is equal to or larger than the threshold value (YES in S1706), the band is determined to be the monochromatic band. If the count value is less than the threshold value (NO in S1706), the band is determined to be the color band.

<S1707: Recognition as Color Band>

If it is determined in S1706 that the band is the color band, the band is recognized as a color band and a recognition result is output to a register or the like.

<S1708: Recognition as Monochromatic Band>

If it is determined in S1706 that the band is the monochromatic band, the band is recognized as a monochromatic band and a recognition result is output to the register or the like.

The output of the high picture quality can be realized by executing the replacing process with reference to the output result according to the above processing flow and, further, in consideration of the bleeding ratio due to the concentration.

In S1609 of the embodiment 1, as a correction value BLUR (luminance), a correction value BLURCOL (luminance) for the color band and a correction value BLURMONO (luminance) for the monochromatic band are prepared. If the target pixel exists in the band which has been determined to be the color band, Lap'(i) is obtained by the following equation (13-1).

$$Lap'(i)=Lap(i)+BLURCOL(luminance) \tag{13-1}$$

If the target pixel exists in the monochromatic band, Lap'(i) is obtained by the following equation (13-2).

$$Lap'(i)=Lap(i)+BLURMONO(luminance) \tag{13-2}$$

Figure 11:
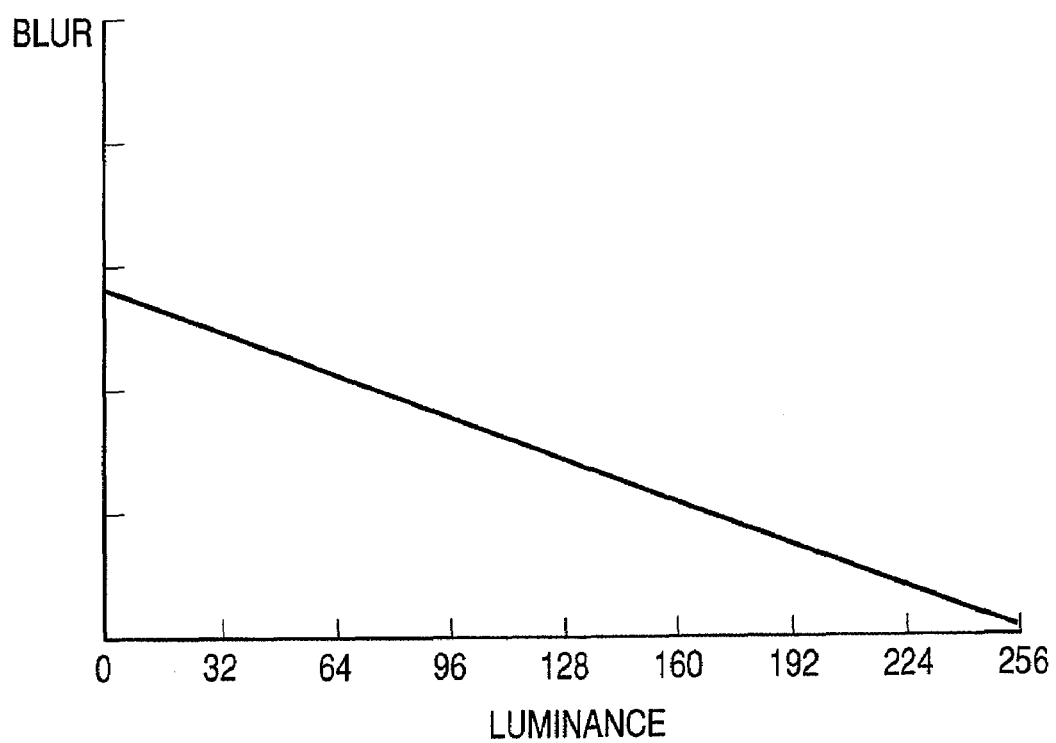
FIG. 11 is a BLUR table only in black ink.
Figure 12:
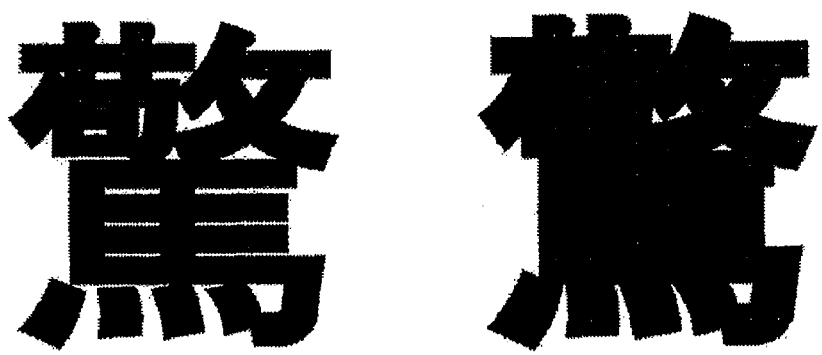
FIG. 12 is a diagram illustrating an example of a blur of a character.

As for tables of the BLURCOL (luminance) and the BLURMONO (luminance), it is desirable to use the table of FIG. 6 mentioned in the embodiment 1 with respect to BLURCOL. It is desirable to obtain the table of BLURMONO by scanning the image which has actually been recorded, in a manner similar to the case of BLURCOL. An example of such a table is illustrated in FIG. 11. Since the image is recorded only by the single ink, the brighter the luminance becomes, the more the ink amount decreases monotonously. The image becomes an image which does not have a peak like a process color. Also in FIG. 11, the luminance on the axis of abscissa is the minimum L determined in S1607 in a manner similar to the case of FIG. 6.

As mentioned above, according to the second embodiment of the invention, even in the recording apparatus in which the discrimination about the monochromatic band and the color band is made on a band unit basis and the using ink is switched, thereby raising the printing speed, the proper correction can be made. The deterioration in reproducibility of the edges of a character or the like is prevented. The image suitable for the user can be provided at a high speed.

Embodiment 3

The third embodiment will be described with respect to the case where the user changes the variable magnification (zoom ratio) by the user interface, in addition to the correction of the bleeding ratio due to the ink concentration and the using ink switching process which have been mentioned in the embodiments 1 and 2.

Processes in the embodiment 3 can be realized by changing the process of S1609 in FIG. 16. If only the correction by the concentration disclosed in the embodiment 1 is made, Lap'(i) is obtained by the following equation (14).

$$\text{Lap}'(i) = \text{Lap}(i) + \text{BLUR}(\text{luminance}) \times K(\text{zoom ratio}) \quad (14)$$

Upon switching of the using ink for realizing the high speed disclosed in the embodiment 2, Lap'(i) is expressed by the following equations (15-1) and (15-2) with respect to the discrimination about the color band and the monochromatic band, respectively.

$$\text{Lap}'(i) = \text{Lap}(i) + \text{BLURCOL}(\text{luminance}) \times K(\text{zoom ratio}) \quad (15\text{-}1)$$

$$\text{Lap}'(i) = \text{Lap}(i) + \text{BLURMONO}(\text{luminance}) \times K(\text{zoom ratio}) \quad (15\text{-}2)$$

K (zoom ratio) is a coefficient depending on the variable magnification (zoom ratio). When the zoom ratio is equal to or larger than an equal magnification (direct copy), K is set to 1. As a reduction ratio increases, it is proper to increase the value of K from 1. In other words, in the case where the reduction ratio is large and the thinner character is damaged by the bleeding or the like and becomes hard to see, the correction value BLUR is increased, thereby enabling the edge portion due to the replacement to be liable to become a background color and improving the discriminating performance.

Although the example in which the user sets the zoom ratio has been described above, the invention is not limited to such a case. For example, naturally, the invention can be also applied to the case where the image is inevitably reduced like a case where the image of the original of the A4 size is printed and output onto a sheet of the B5 size.

According to the third embodiment of the invention as mentioned above, by considering the zoom ratio of the image together with the correction of the bleeding ratio based on the ink concentration and the type of using ink, the deterioration in reproducibility of the edges of the character or the like is prevented. The image suitable for the user can be provided at a high speed.

Although the invention has been described with respect to the copying function of the multi function printer apparatus as an example, the invention is not limited to such a case but can be also embodied in the case where data transmitted from the computer apparatus (PC) is printed by one of the multi function printer apparatus and the printer. Further, the invention can be also embodied in the case where the scanner is connected to the computer apparatus (PC), the image data read out by the scanner is transferred to the PC, and the data is transmitted from the PC to one of the multi function printer apparatus and the printer and printed. In such cases, although the processes shown in the embodiments 1 to 3 can be executed by one of the multi function printer apparatus and the printer, a program to execute those processes may be stored into the storing unit such as a memory or the like of the PC and may be executed by the CPU of the PC. Further, a part of the processes shown in the embodiments 1 to 3 can be executed by the PC and the residual processes can be executed by one of the multi function printer apparatus and the printer.

According to the embodiments 1 to 3, by solving the foregoing problems and correcting the bleeding of the ink of the ink-jet recording apparatus every concentration, the higher precise correction is realized and the good edge portion can be reproduced. According to the embodiment 2, even in the case where the monochromatic/color discriminating process is executed and the using ink is switched in order to realize the high speed, the proper correcting process can be realized for each ink. Further, according to the embodiment 3, even in the case where the zooming for the reduction copy or the like has been set, the damage of the character caused by the reduction can be suppressed. Thus, the higher character reproducibility and the higher discriminating performance can be provided to the user.

The present application claims priority from Japanese Patent Application JP2006-188048 filed on Jul. 7, 2006, the content of which is hereby incorporated by reference into this application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-188048, filed Jul. 7, 2006, which is hereby incorporated by reference herein in its entirety.

What is claimed is:

1. An image processing apparatus for an image constructed by a plurality of pixels having a signal of at least one color, comprising:
    a correction concentration obtaining unit which obtains a concentration after a correcting process;
    a correction coefficient changing unit which changes a correction coefficient based on a value of the concentration obtained by the correction concentration obtaining unit; an image correcting unit which makes an image correction by the correction coefficient changed by the correction coefficient changing unit; and
    an image recording processing unit which executes a recording process to the image corrected by the image correcting unit,
    wherein the correction coefficient changing unit changes the correction coefficient based on a bleeding ratio in the different concentration.

2. An image processing apparatus for an image constructed by a plurality of pixels having a signal of at least one color, comprising:
    a correction concentration obtaining unit which obtains a concentration after a correcting process;
    a correction coefficient changing unit which changes a correction coefficient based on a value of the concentration obtained by the correction concentration obtaining unit; an image correcting unit which makes an image correction by the correction coefficient changed by the correction coefficient changing unit; and
    an image recording processing unit which executes a recording process to the image corrected by the image correcting unit, wherein the correction coefficient changing unit obtains and changes the correction coefficient from a relation between a bleeding ratio in the different concentration and a zoom ratio adapted to change a size of an input image to an output image size.

3. An apparatus according to claims 1 or 2, wherein the image correction is a replacing process.

4. An apparatus according to claims 1 or 2, wherein a replacement target pixel in a replacing process is changed based on the correction coefficient changed by the correction coefficient changing unit.

5. An apparatus according to claim 1 or 2, wherein the correction concentration obtaining unit is a unit which obtains the concentration of the pixel selected from an area around a target pixel.

6. An apparatus according to claim 1 or 2, wherein the correction concentration obtaining unit includes: an edge detecting unit which detects an edge direction from an area around a target pixel; and a unit which obtains the concentration of the pixel selected from the edge direction detected by the edge detecting unit.

7. An image processing apparatus for an image constructed by a plurality of pixels having a signal of at least one color, comprising:
   an ink color discrimination processing unit which decides a color of ink which is used from a value of the signal;
   a correction concentration obtaining unit which obtains a concentration after a correcting process;
   a correction coefficient changing unit which changes a correction coefficient from information of the using ink decided by the ink color discrimination processing unit and a value of the concentration obtained by the correction concentration obtaining unit;
   an image correcting unit which makes an image correction by the correction coefficient changed by the correction coefficient changing unit; and
an image recording processing unit which executes a recording process to the image corrected by the image correcting unit,
   wherein the correction coefficient changing unit changes the correction coefficient based on a bleeding ratio in the using ink determined by the ink color discrimination processing unit.

8. An image processing apparatus for an image constructed by a plurality of pixels having a signal of at least one color, comprising:
   an ink color discrimination processing unit which decides a color of ink which is used from a value of the signal;
   a correction concentration obtaining unit which obtains a concentration after a correcting process;
   a correction coefficient changing unit which changes a correction coefficient from information of the using ink decided by the ink color discrimination processing unit and a value of the concentration obtained by the correction concentration obtaining unit;
   an image correcting unit which makes an image correction by the correction coefficient changed by the correction coefficient changing unit; and
an image recording processing unit which executes a recording process to the image corrected by the image correcting unit,
   wherein the correction coefficient changing unit changes the correction coefficient based on a bleeding ratio in the using ink decided by the ink color discrimination processing unit and a bleeding ratio in the different concentration.

9. An image processing apparatus for an image constructed by a plurality of pixels having a signal of at least one color, comprising:
   an ink color discrimination processing unit which decides a color of ink which is used from a value of the signal;
   a correction concentration obtaining unit which obtains a concentration after a correcting process;
   a correction coefficient changing unit which changes a correction coefficient from information of the using ink decided by the ink color discrimination processing unit and a value of the concentration obtained by the correction concentration obtaining unit;
   an image correcting unit which makes an image correction by the correction coefficient changed by the correction coefficient changing unit; and
an image recording processing unit which executes a recording process to the image corrected by the image correcting unit,
   wherein the correction coefficient changing unit obtains and changes the correction coefficient based on a relation among a bleeding ratio in the using ink decided by the ink color discrimination processing unit, a bleeding ratio in the different concentration, and a zoom ratio adapted to change a size of an input image into an output image size.

10. An apparatus according to claims 7, 8 or 9, wherein the image correction is a replacing process.

11. An apparatus according to claims 7, 8 or 9, wherein a replacement target pixel in a replacing process is changed based on the correction coefficient changed by the correction coefficient changing unit.

12. An apparatus according to claim 7, 8 or 9, wherein the ink color discrimination processing unit discriminates whether or not a predetermined area in a main scanning direction including a target pixel can be determined to have only an achromatic pixel, if a result of the discrimination indicates the achromatic pixel, only black ink is used, and in the other cases, only color ink is used or both of the black ink and the color ink are mixedly used.

13. An apparatus according to claim 7, 8 or 9, wherein the correction concentration obtaining unit is a unit which obtains the concentration of the pixel selected from an area around a target pixel.

14. An apparatus according to claim 7, 8 or 9, wherein the correction concentration obtaining unit includes: an edge detecting unit which detects an edge direction from an area around a target pixel; and a unit which obtains the concentration of the pixel selected from the edge direction detected by the edge detecting unit.

15. An image processing method for an image constructed by a plurality of pixels having a signal of at least one color, comprising:
   obtaining a concentration after a correcting process;
   changing a correction coefficient based on a value of the concentration obtained in the correction concentration obtaining process;
   executing an image correction by the correction coefficient changed in the correction coefficient changing process; and
executing a recording process to the image corrected in the image correction process,
   wherein in the correction coefficient changing process, the correction coefficient is changed based on a bleeding ratio in the different concentration.

16. An image processing method for an image constructed by a plurality of pixels having a signal of at least one color, comprising:
   obtaining a concentration after a correcting process;
   changing a correction coefficient based on a value of the concentration obtained in the correction concentration obtaining process;
   executing an image correction by the correction coefficient changed in the correction coefficient changing process; and executing a recording process to the image corrected in the image correction process, wherein in the correction coefficient changing process, the correction coefficient is obtained and changed from a relation between a bleeding ratio in the different concentration and a zoom ratio adapted to change a size of input image into an output image size.

17. A method according to claim 15 or 16, wherein the image correction is a replacing process.

18. A method according to claim 15 or 16, wherein a replacement target pixel in a replacing process is changed based on the correction coefficient changed in the correction coefficient changing process.

19. A computer-readable storage medium storing a computer-executable image processing program for allowing a computer to execute the method according to claim 15 or 16.

20. A method according to claim 15 or 16, wherein in the correction concentration obtaining process, the concentration of the pixel selected from an area around a target pixel is obtained.

21. A method according to claim 15 or 16, wherein the correction concentration obtaining process includes: detecting an edge direction from an area around a target pixel; and obtaining the concentration of the pixel selected from the edge direction detected by the edge detection.

22. An image processing method for an image constructed by a plurality of pixels having a signal of at least one color, comprising:

determining a color of ink which is used from a value of the signal;

obtaining a concentration after a correcting process;

changing a correction coefficient from information of the using ink decided by the ink color discriminating process and a value of the concentration obtained in the correction concentration obtaining process;

executing an image correction by the correction coefficient changed in the correction coefficient changing process; and executing a recording process to the image corrected by the image correction, wherein changing the correction coefficient is based on a bleeding ratio in the using ink.

23. A computer-readable storage medium storing a computer-executable image processing program for allowing a computer to execute the method according to claim 22.

* * * * *